United States Patent
Bayyouk et al.

(10) Patent No.: US 10,240,597 B2
(45) Date of Patent: Mar. 26, 2019

(54) PUMP ASSEMBLY INCLUDING FLUID CYLINDER AND TAPERED VALVE SEATS

(71) Applicant: S.P.M. FLOW CONTROL, INC., Fort Worth, TX (US)

(72) Inventors: Jacob A. Bayyouk, Richardson, TX (US); Tugrul Comlekci, Glasgow (GB)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

(21) Appl. No.: 15/355,609

(22) Filed: Nov. 18, 2016

(65) Prior Publication Data

US 2017/0067459 A1 Mar. 9, 2017

Related U.S. Application Data

(63) Continuation of application No. 29/546,567, filed on Nov. 24, 2015, now Pat. No. Des. 787,029, which is
(Continued)

(51) Int. Cl.
*F04B 7/00* (2006.01)
*F16K 1/36* (2006.01)
(Continued)

(52) U.S. Cl.
CPC ............ *F04B 53/1087* (2013.01); *B23P 6/00* (2013.01); *B23P 15/00* (2013.01); *F04B 7/00* (2013.01);
(Continued)

(58) Field of Classification Search
CPC ...... F04B 53/1087; F04B 53/10; F04B 53/16; F04B 7/00; F04B 39/122; F04B 53/22;
(Continued)

(56) References Cited

U.S. PATENT DOCUMENTS 1,517,883 A  12/1924  Alleman
1,553,171 A  9/1925  Jones
(Continued)

FOREIGN PATENT DOCUMENTS

AU  9517960 A  11/1995
CA  2116461 A1  11/1994
(Continued)

OTHER PUBLICATIONS

Baker SPD Drilling Products http://file.seekpart.com/keywordpdf/2011/5/20/201152021491489.pdf, dated May 20, 2011.*
(Continued)

*Primary Examiner* — Nathan C Zollinger
(74) *Attorney, Agent, or Firm* — Haynes and Boone, LLP

(57) ABSTRACT

According to one aspect, a pump assembly includes a fluid cylinder, the fluid cylinder including a fluid passage, the fluid passage defining a tapered internal shoulder of the fluid cylinder, the tapered internal shoulder defining a first angle. A valve controls flow of fluid through the fluid passage. The valve includes a valve seat, which is disposed in the fluid passage and includes a tapered external shoulder, the tapered external shoulder defining a second angle. In one embodiment, the first tapered external shoulder engages the first tapered internal shoulder to distribute and transfer loading.

10 Claims, 7 Drawing Sheets

Related U.S. Application Data a continuation of application No. 29/446,059, filed on Feb. 20, 2013, now Pat. No. Des. 748,228, which is a continuation of application No. 13/755,217, filed on Jan. 31, 2013, now abandoned.

(51) Int. Cl.
| | | |
|---|---|---|
| *F16K 1/42* | (2006.01) | |
| *F04B 53/10* | (2006.01) | |
| *F16K 25/00* | (2006.01) | |
| *F04B 53/16* | (2006.01) | |
| *F04B 53/22* | (2006.01) | |
| *F16K 15/06* | (2006.01) | |
| *B23P 15/00* | (2006.01) | |
| *B23P 6/00* | (2006.01) | |

(52) U.S. Cl.
CPC .............. *F04B 53/10* (2013.01); *F04B 53/16* (2013.01); *F04B 53/162* (2013.01); *F04B 53/22* (2013.01); *F16K 1/36* (2013.01); *F16K 1/42* (2013.01); *F16K 15/063* (2013.01); *F16K 25/00* (2013.01); *Y10T 29/49236* (2015.01)

(58) Field of Classification Search
CPC . F16K 15/063; F16K 1/36; F16K 1/42; F16K 25/00; Y10T 29/49236
USPC .................................. 251/360, 361, 362, 363
See application file for complete search history.

(56) References Cited

U.S. PATENT DOCUMENTS

| | | |
|---|---|---|
| 1,652,857 A | 12/1927 | Greve |
| 1,705,789 A | 3/1929 | Steirly |
| 1,707,017 A | 3/1929 | Kibele |
| 1,726,187 A | 8/1929 | Mahan |
| 1,908,899 A | 5/1933 | Kayel |
| 1,914,737 A | 6/1933 | Elms |
| 1,948,628 A | 2/1934 | Penick et al. |
| 2,421,276 A | 5/1947 | Lotz |
| 2,475,040 A | 7/1949 | Mandl |
| 2,573,567 A | 10/1951 | Hancock |
| 2,602,434 A | 7/1952 | Barnaby |
| 2,623,276 A | 12/1952 | Anderson |
| 2,898,082 A | 8/1959 | Von Almen et al. |
| 2,903,235 A | 9/1959 | Rodgers et al. |
| 2,969,951 A * | 1/1961 | Walton ................ F04B 53/1027 137/543.13 |
| 2,982,515 A | 5/1961 | Rule |
| 2,983,281 A | 5/1961 | Bynum |
| 3,029,501 A | 4/1962 | Leathers |
| 3,063,467 A | 11/1962 | Roberts, Jr. et al. |
| D196,724 S | 10/1963 | Davis et al. |
| 3,114,644 A | 12/1963 | Peterson |
| 3,191,905 A | 6/1965 | Brown |
| 3,387,353 A | 6/1968 | Romero |
| 3,474,808 A | 10/1969 | Robert |
| 3,489,170 A | 1/1970 | Arthur |
| D227,558 S | 7/1973 | Matthews et al. |
| 3,801,234 A | 4/1974 | Love et al. |
| 3,808,666 A | 5/1974 | Bales |
| 3,830,255 A | 8/1974 | Freiheit |
| 3,952,393 A | 4/1976 | Van Ravenzwaay et al. |
| 3,990,139 A | 11/1976 | Touchet |
| D244,533 S | 5/1977 | Eidelberg et al. |
| 4,076,212 A | 2/1978 | Leman |
| 4,077,102 A | 3/1978 | Smith |
| 4,103,663 A | 8/1978 | Elsbett et al. |
| 4,192,520 A | 3/1980 | Hasegawa |
| 4,203,180 A | 5/1980 | Striplin |
| 4,257,163 A | 3/1981 | Bauer |
| 4,285,126 A | 8/1981 | Irwin |
| 4,432,386 A | 2/1984 | Pacht |
| 4,518,329 A | 5/1985 | Weaver |
| 4,547,005 A | 10/1985 | Soederhuyzen |
| D292,308 S | 10/1987 | Beltran |
| 4,757,974 A * | 7/1988 | Ward .................... F16K 15/063 137/542 |
| 4,770,206 A | 9/1988 | Sjoberg |
| 4,860,995 A | 8/1989 | Rogers |
| D303,710 S | 9/1989 | Neill |
| 4,878,815 A | 11/1989 | Stachowiak |
| 4,922,957 A | 5/1990 | Johnson |
| 4,928,726 A | 5/1990 | Johnson et al. |
| 4,951,707 A | 8/1990 | Johnson |
| 5,052,435 A | 10/1991 | Crudup et al. |
| 5,088,521 A | 2/1992 | Johnson |
| 5,117,546 A | 6/1992 | Lawrence et al. |
| D330,073 S | 10/1992 | Valls |
| 5,193,577 A | 3/1993 | De Koning |
| 5,211,198 A | 5/1993 | Tinholt |
| 5,234,322 A | 8/1993 | Daniels et al. |
| 5,249,600 A | 10/1993 | Blume |
| 5,345,965 A | 9/1994 | Blume |
| D355,708 S | 2/1995 | Caine |
| 5,431,186 A | 7/1995 | Blume |
| 5,505,530 A | 4/1996 | Kramer et al. |
| 5,533,245 A | 7/1996 | Stanton |
| D374,710 S | 10/1996 | Gustafsson |
| 5,695,224 A | 12/1997 | Grenier |
| 5,816,497 A | 10/1998 | Leon et al. |
| 5,876,189 A | 3/1999 | Lukas et al. |
| 6,073,886 A | 6/2000 | Jakubowski, Jr. et al. |
| 6,195,863 B1 | 3/2001 | Blake |
| 6,227,225 B1 | 5/2001 | Domingue |
| 6,382,940 B1 | 5/2002 | Blume |
| 6,435,475 B1 | 8/2002 | Blume |
| D466,652 S | 12/2002 | Thurman |
| 6,623,259 B1 | 9/2003 | Blume |
| 6,641,112 B2 | 11/2003 | Antoff et al. |
| 6,641,115 B1 | 11/2003 | Bainter |
| 6,679,477 B1 | 1/2004 | Blume |
| 6,695,007 B2 | 2/2004 | Vicars |
| 6,701,955 B2 | 3/2004 | McIntire et al. |
| D488,859 S | 4/2004 | Stout, Jr. |
| 6,910,871 B1 | 6/2005 | Blume |
| 6,955,181 B1 | 10/2005 | Blume |
| 6,955,339 B1 | 10/2005 | Blume |
| D513,072 S | 12/2005 | Berg |
| D514,671 S | 2/2006 | Jones |
| 7,000,632 B2 | 2/2006 | McIntire et al. |
| 7,011,111 B2 | 3/2006 | Spiegl et al. |
| D524,427 S | 7/2006 | Wilk et al. |
| D534,253 S | 12/2006 | Sandman et al. |
| 7,168,440 B1 | 1/2007 | Blume |
| 7,172,175 B2 * | 2/2007 | Vicars .................... F16K 15/063 137/516.29 |
| 7,222,837 B1 | 5/2007 | Blume |
| D554,974 S | 11/2007 | Huang |
| 7,296,591 B2 | 11/2007 | Moe et al. |
| D556,866 S | 12/2007 | Darce |
| D557,771 S | 12/2007 | Darce |
| 7,335,002 B2 | 2/2008 | Vicars |
| D564,656 S | 3/2008 | Matsutori |
| 7,341,435 B2 | 3/2008 | Vicars |
| D574,934 S | 8/2008 | Darce |
| 7,513,483 B1 | 4/2009 | Blume |
| D614,271 S | 4/2010 | Weston |
| D616,966 S | 6/2010 | Angell |
| 7,748,095 B1 | 7/2010 | Phane |
| 7,832,071 B2 | 11/2010 | Klann |
| D631,142 S | 1/2011 | Angell |
| 8,191,575 B2 | 6/2012 | Krug, Jr. et al. |
| D682,989 S | 5/2013 | Eagle |
| D682,994 S | 5/2013 | Schulz |
| D687,145 S | 7/2013 | Gronberg |
| 8,496,224 B1 | 7/2013 | Gilstad et al. |
| D695,066 S | 12/2013 | Nakajima |
| D700,682 S | 3/2014 | Bayyouk et al. |
| D715,145 S | 10/2014 | Yamagishi et al. |
| D717,405 S | 11/2014 | Coronado |
| D720,838 S | 1/2015 | Yamagishi |

(56) References Cited

U.S. PATENT DOCUMENTS

| | | | |
|---|---|---|---|
| 9,822,894 B2* | 11/2017 | Bayyouk | F16K 25/005 |
| 2003/0084556 A1 | 5/2003 | Dunlop | |
| 2004/0170507 A1* | 9/2004 | Vicars | F04B 53/007 |
| | | | 417/360 |
| 2004/0234404 A1 | 11/2004 | Vicars | |
| 2004/0239115 A1 | 12/2004 | Wilk et al. | |
| 2005/0081830 A1 | 4/2005 | Yu et al. | |
| 2005/0247353 A1 | 11/2005 | Kao | |
| 2006/0049627 A1 | 3/2006 | Happel | |
| 2006/0124176 A1 | 6/2006 | McIntire et al. | |
| 2006/0131533 A1 | 6/2006 | Oh et al. | |
| 2006/0273277 A1 | 12/2006 | Heller et al. | |
| 2008/0048446 A1 | 2/2008 | Houghton | |
| 2008/0279706 A1 | 11/2008 | Gambier et al. | |
| 2008/0284166 A1 | 11/2008 | Darce | |
| 2009/0012543 A1 | 1/2009 | Kansoul | |
| 2009/0314979 A1 | 12/2009 | McIntire | |
| 2010/0275445 A1 | 11/2010 | Weide | |
| 2010/0325888 A1 | 12/2010 | Hawes | |
| 2011/0030213 A1 | 2/2011 | Hawes et al. | |
| 2011/0079302 A1* | 4/2011 | Hawes | F16K 25/005 |
| | | | 137/538 |
| 2011/0126804 A1 | 6/2011 | Lucas et al. | |
| 2011/0173814 A1 | 7/2011 | Patel | |
| 2011/0181040 A1 | 7/2011 | Thompson et al. | |
| 2012/0141308 A1 | 6/2012 | Saini et al. | |
| 2012/0292550 A1 | 11/2012 | Meek | |
| 2013/0020521 A1 | 1/2013 | Byrne | |
| 2013/0168586 A1 | 7/2013 | Cordova et al. | |
| 2013/0168591 A1 | 7/2013 | Webster | |
| 2013/0202457 A1 | 8/2013 | Bayyouk et al. | |
| 2013/0202458 A1 | 8/2013 | Byrne et al. | |

FOREIGN PATENT DOCUMENTS

| | | |
|---|---|---|
| CA | 152227 | 6/2014 |
| CA | 152313 | 6/2014 |
| CN | 2690624 Y | 4/2005 |
| CN | 2861553 Y | 1/2007 |
| CN | 2898364 Y | 5/2007 |
| CN | 200984728 Y | 12/2007 |
| CN | 201225272 Y | 4/2009 |
| CN | 201284735 Y | 8/2009 |
| CN | 201425921 Y | 3/2010 |
| CN | 201621057 U | 11/2010 |
| CN | 201730815 Y | 2/2011 |
| CN | 201747329 | 2/2011 |
| CN | 201769174 | 3/2011 |
| CN | 201786639 U | 4/2011 |
| CN | 202001288 U | 10/2011 |
| CN | 202220728 U | 5/2012 |
| CN | 202326186 U | 7/2012 |
| CN | 103370543 A | 10/2013 |
| CN | 103597262 A | 2/2014 |
| CN | ZL201330349899 | 2/2014 |
| CN | ZL2013303742673 | 3/2014 |
| DE | 69603178 T2 | 3/2000 |
| EP | 0237112 A1 | 9/1987 |
| EP | 0512594 A1 | 11/1992 |
| GB | 855956 A | 12/1960 |
| JP | 7113426 B | 12/1995 |
| JP | 9217677 A | 8/1997 |
| JP | 2002161982 A | 6/2002 |
| JP | 2003065439 A | 3/2003 |
| JP | 2008539364 | 11/2008 |
| JP | 2008546951 A | 12/2008 |
| JP | 2011017332 A | 1/2011 |
| KR | 181711 B1 | 5/1999 |
| KR | 1019990079544 | 11/1999 |
| KR | 100383826 B1 | 5/2003 |
| KR | 100402825 B1 | 10/2003 |
| KR | 798807 B1 | 1/2008 |
| NL | 1020775 C2 | 12/2003 |
| RU | 2073808 C1 | 2/1997 |
| SU | 1576717 A1 | 7/1990 |
| SU | 1751570 A1 | 7/1992 |
| WO | WO-1999050578 | 10/1999 |
| WO | WO-2008137515 A1 | 11/2008 |
| WO | WO-2011002902 A2 | 1/2011 |
| WO | WO-2011008763 A2 | 1/2011 |
| WO | WO-2011017689 A2 | 2/2011 |
| WO | WO-2011044332 A2 | 4/2011 |
| WO | WO-2011060422 A2 | 5/2011 |
| WO | WO-2012083179 A2 | 6/2012 |
| WO | WO-2012142276 A1 | 10/2012 |
| WO | WO-2013116488 | 8/2013 |
| WO | WO-2013116634 | 8/2013 |

OTHER PUBLICATIONS

"Advisory Action dated Oct. 10, 2013, by the USPTO, re U.S. Appl. No. 13/445,513".

"Final Office Action dated Jul. 5, 2013, by the USPTO, re U.S. Appl. No. 13/445,513".

"International Preliminary Report on Patentability Ch II, dated Apr. 15, 2013, by the IPEA/US, re PCT/US2012/033307".

"International Search Report and Written Opinion by the ISA/US, dated Apr. 9, 2013, re PCT/US2013/024096".

"International Search Report and Written Opinion by the ISA/US, dated Apr. 9, 2013, re PCT/US2013/024325".

International Search Report and Written Opinion for Application No. PCT/US2010/044828 dated Mar. 29, 2011, 6 pages.

International Search Report and Written Opinion for Application No. PCT/US2010/051777 dated Jun. 21, 2011, 11 pages.

International Search Report and Written Opinion for Application No. PCT/US2010/056846 dated Jun. 23, 2011, 6 pages.

International Search Report and Written Opinion for Application No. PCT/US2012/033307 dated Jul. 5, 2012, 10 pages.

"Notice of Allowance dated Dec. 5, 2013, by the USPTO, re U.S. Appl. No. 29/444,103".

"Office Action dated Apr. 29, 2013, by the USPTO, re U.S. Appl. No. 12/852,376".

"Office Action dated Mar. 25, 2013, by the USPTO, re U.S. Appl. No. 13/445,513".

"Office Action dated Mar. 26, 2013, by the USPTO, re U.S. Appl. No. 12/947,498".

"Office Action dated May 8, 2012, by the USPTO, re U.S. Appl. No. 12/900,146".

"Restriction Requirement dated Jan. 8, 2013, by the USPTO, re U.S. Appl. No. 12/947,498".

SPM Drawing #3L108223, Seat Puller Assy Listing TWS400-QWS, mailed on Aug. 2, 2002.

SPM Drawing #P108217, Seat Puller Head Assembly 1.25, mailed on Sep. 22, 2008.

SPM Drawing #P23579, Seat Puller/Head Assy. 4.50"—5.00" TWS900, QWS mailed on Aug. 4, 2008.

SPM Engineering Bulletin 1010, Valve Seat Puller Jaws All Sizes of Valve Seats 2S-7S—Original Style—New Style Featuring Initial Standoff—mailed on Jan. 1997.

"Office Action dated Jul. 14, 2014, by the USPTO, re U.S. Appl. No. 13/756,715".

"Office Action dated Jul. 16, 2014, by the USPTO, re U.S. Appl. No. 13/755,217".

Notice of Allowance dated Feb. 27, 2015, by the USPTO, re U.S. Appl. No. 29/446,059.

Notice of Allowance dated Aug. 26, 2015, by the USPTO, re U.S. Appl. No. 29/446,059.

Notice of Allowance dated Jan. 9, 2017, by the USPTO, re U.S. Appl. No. 29/546,567.

* cited by examiner

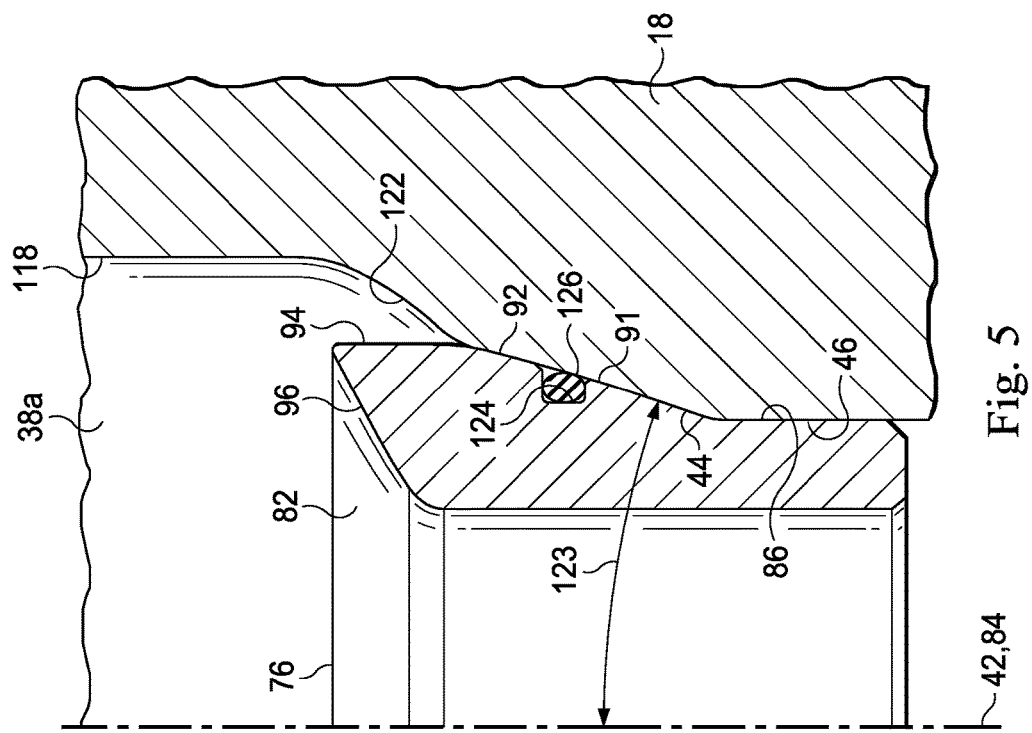
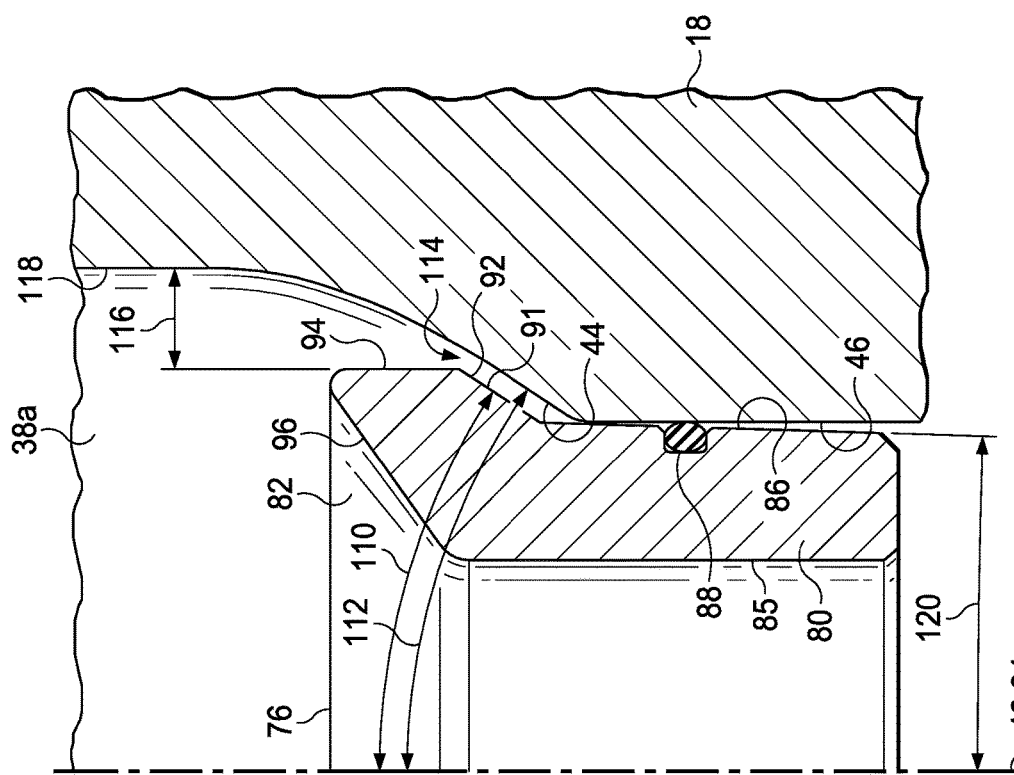

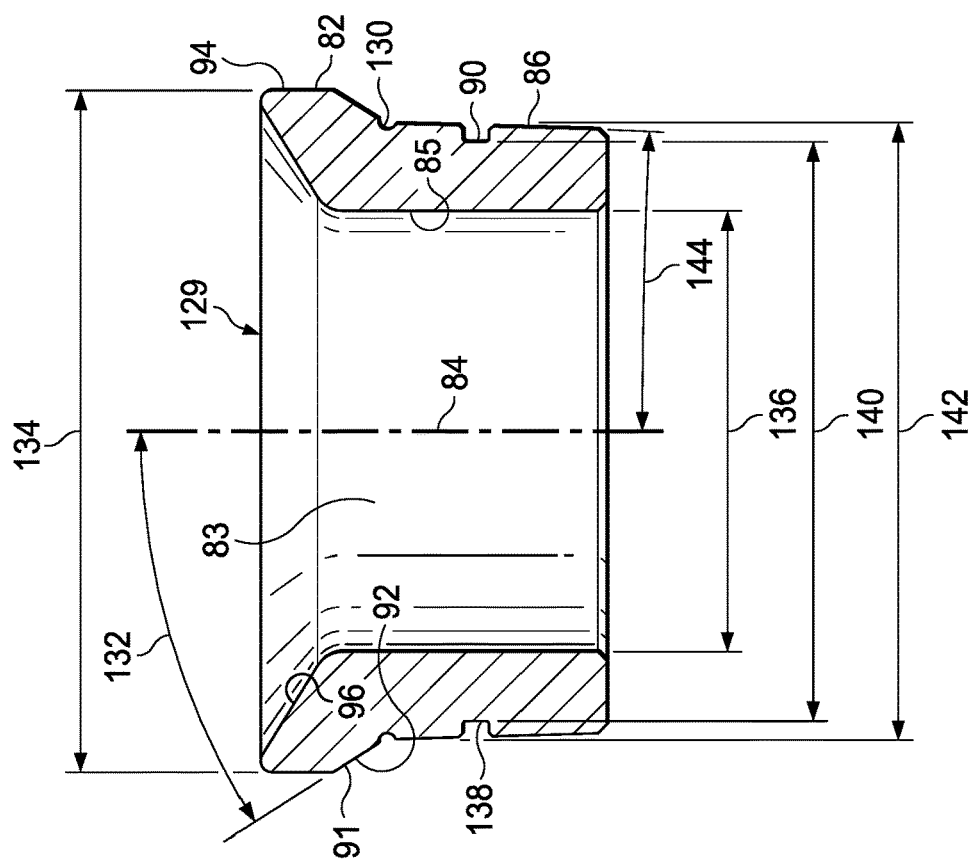
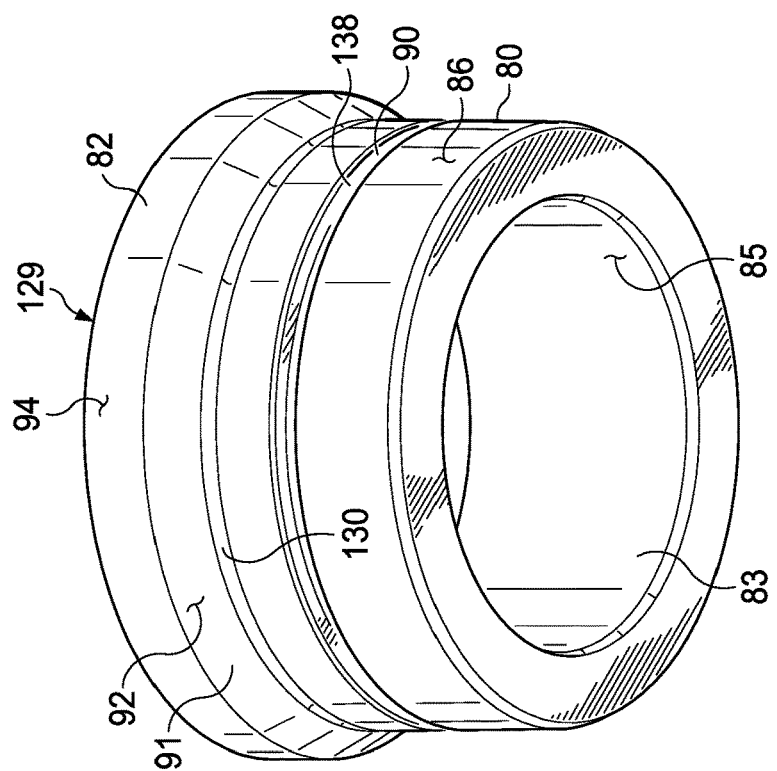

PUMP ASSEMBLY INCLUDING FLUID CYLINDER AND TAPERED VALVE SEATS

CROSS-REFERENCE TO RELATED APPLICATIONS

This application is a continuation of U.S. patent application Ser. No. 29/546,567, filed Nov. 24, 2015, which is a continuation of U.S. patent application Ser. No. 29/446,059, filed Feb. 20, 2013, now U.S. Patent No. D748,228, issued Jan. 26, 2016, which is a continuation of U.S. patent application Ser. No. 13/755,217, filed Jan. 31, 2013; the entire disclosures of U.S. patent application Ser. No. 29/546,567, 29/446,059, and 13/755,217 are hereby incorporated herein by reference.

TECHNICAL FIELD

This disclosure relates in general to pump assemblies and, in particular, a reciprocating pump assembly including a fluid cylinder and valve seats.

BACKGROUND OF THE DISCLOSURE

Reciprocating pump assemblies typically include fluid end blocks or fluid cylinders and inlet and outlet valves disposed therein. During operation, the inlet and outlet valves typically experience high loads and frequencies. In some cases, valve seats of the inlet and outlet valves, as well as portions of the fluid cylinder engaged therewith, may be subjected to highly concentrated cyclic loads and thus may fatigue to failure. Moreover, it is sometimes difficult to remove valve seats from the fluid cylinder for replacement, which difficulty may result in damage to the fluid cylinder. Further, when replacing a worn valve seat or producing a new pump assembly, an incorrect valve seat may unintentionally be disposed in the fluid cylinder, which may hurt pump performance and possibly damage the fluid cylinder or valve seat. In many cases, this mix-up of parts is possible because differences between valve seats may not be easily discernable upon visual inspection. Therefore, what is needed is an apparatus or method that addresses one or more of the foregoing issues, among others.

SUMMARY

In a first aspect, there is provided a pump assembly that includes a fluid cylinder having a first axis, the fluid cylinder includes a first fluid passage through which fluid is adapted to flow along the first axis, the first fluid passage defining a first tapered internal shoulder of the fluid cylinder, the first tapered internal shoulder defining a first angle from the first axis; and a first valve to control flow of fluid through the first fluid passage, the first valve includes a first valve seat disposed in the first fluid passage, the first valve seat having a second axis that is aligned with the first axis, the first valve seat includes a first tapered external shoulder, the first tapered external shoulder defining a second angle from the second axis; wherein each of the first and second angles ranges from about 10 degrees to about 45 degrees measured from the first axis and the second axis aligned therewith.

In an exemplary embodiment, the first tapered internal shoulder and the first tapered external shoulder define first and second frusto-conical surfaces, respectively; and wherein the first tapered internal shoulder engages the first tapered external shoulder to distribute and transfer loading between the first and second frusto-conical surfaces.

In certain exemplary embodiments, the first and second angles are equal.

In another exemplary embodiment, each of the first and second angles is about 30 degrees measured from the first axis and the second axis aligned therewith.

In certain exemplary embodiments, the fluid cylinder further includes a pressure chamber in fluid communication with the first fluid passage; a second fluid passage in fluid communication with the pressure chamber and through which fluid is adapted to flow along the first axis, the second fluid passage defining a second tapered internal shoulder of the fluid cylinder, the second tapered internal shoulder defining a third angle from the first axis; a fluid inlet passage in fluid communication with the pressure chamber via the first fluid passage; and a fluid outlet passage in fluid communication with the pressure chamber via the second fluid passage; wherein the pump assembly further includes a second valve to control flow of the fluid through the second fluid passage, the second valve includes a second valve seat disposed in the second fluid passage, the second valve seat having a third axis that is aligned with each of the first and second axes, the second valve seat includes a second tapered external shoulder, the second tapered external shoulder defining a fourth angle from the third axis; and wherein each of the third and fourth angles ranges from about 10 degrees to about 45 degrees measured from the first axis and each of the second and third axes aligned therewith.

In another exemplary embodiment, the second tapered internal shoulder and the second tapered external shoulder defines third and fourth frusto-conical surfaces, respectively; and wherein the second tapered internal shoulder engages the second tapered external shoulder to distribute and transfer loading between the third and fourth frusto-conical surfaces.

In yet another exemplary embodiment, the third and fourth angles are equal.

In an exemplary embodiment, each of the third and fourth angles is about 30 degrees measured from the first axis and each of the second and third axes aligned therewith.

In another exemplary embodiment, the first valve seat further includes a seat body, the seat body includes an enlarged-diameter portion at one end thereof, the enlarged-diameter portion includes the first tapered external shoulder and defining a first cylindrical surface extending axially from the first frusto-conical surface, the first cylindrical surface defining a first outside diameter; a bore formed through the seat body, the bore defining a second cylindrical surface, the second cylindrical surface defining a first inside diameter; wherein the first fluid passage includes an enlarged-diameter portion and a reduced-diameter portion extending axially therefrom; wherein the enlarged-diameter portion of the first fluid passage defines the first tapered internal shoulder of the fluid cylinder; wherein the reduced-diameter portion of the first fluid passage defines an inside surface of the fluid cylinder and a second inside diameter; wherein the enlarged-diameter portion of the seat body is disposed in the enlarged-diameter portion of the first fluid passage; wherein the seat body defines an outside surface that is engaged with the inside surface of the fluid cylinder; and wherein the outside surface defines a second outside diameter.

In yet another exemplary embodiment, at least one of the inside surface of the fluid cylinder and the outside surface of the seat body is tapered at a taper angle from the first axis and the second axis aligned therewith, the taper angle ranging from greater than 0 degrees to about 5 degrees measured from the first axis and the second axis aligned therewith.

In an exemplary embodiment, the first valve seat further includes an annular groove formed in the outside surface of the seat body, the annular groove defining a groove diameter; and a sealing element disposed in the annular groove and sealingly engaging the inside surface of the fluid cylinder.

In another exemplary embodiment, each of the first and second angles is about 30 degrees; wherein the first outside diameter is about 5 inches; wherein the first inside diameter is about 3 inches; wherein the second inside diameter is about 4.5 inches; wherein the groove diameter is about 4 inches; and wherein the second outside diameter is about 4.5 inches.

In yet another exemplary embodiment, the fluid cylinder further includes a pressure chamber in fluid communication with the first fluid passage; and wherein the pump assembly further includes a housing connected to the fluid cylinder, and a plunger rod assembly extending out of the housing and into the pressure chamber.

In a second aspect, a fluid cylinder for a pump assembly is provided, the fluid cylinder having a fluid passage axis and includes a first fluid passage through which fluid is adapted to flow along the fluid passage axis, the first fluid passage defining a first tapered internal shoulder of the fluid cylinder, the first tapered internal shoulder defining a first angle from the fluid passage axis, the first angle ranging from about 10 degrees to about 45 degrees measured from the fluid passage axis; and a pressure chamber in fluid communication with the first fluid passage.

In certain exemplary embodiment, the first angle is about 30 degrees measured from the fluid passage axis.

In an exemplary embodiment, the fluid cylinder includes a second fluid passage in fluid communication with the pressure chamber and through which fluid is adapted to flow along the fluid passage axis, the second fluid passage defining a second tapered internal shoulder of the fluid cylinder, the second tapered internal shoulder defining a second angle from the fluid passage axis; and a fluid outlet passage in fluid communication with the pressure chamber via the second fluid passage; wherein the second angle ranges from about 10 degrees to about 45 degrees measured from the fluid passage axis.

In another exemplary embodiment, the first and second angles are equal.

In yet another exemplary embodiment, each of the first and second angles is about 30 degrees measured from the fluid passage axis.

In certain exemplary embodiments, the first fluid passage includes an enlarged-diameter portion and a reduced-diameter portion extending axially therefrom; wherein the enlarged-diameter portion of the first fluid passage defines the first tapered internal shoulder of the fluid cylinder; and wherein the reduced-diameter portion of the first fluid passage defines an inside surface of the fluid cylinder and an inside diameter.

In another exemplary embodiment, the inside surface is tapered at a taper angle from the fluid passage axis, the taper angle ranging from greater than 0 degrees to about 5 degrees measured from the fluid passage axis.

In an exemplary embodiment, each of the first and second angles is about 30 degrees; and wherein the inside diameter is about 4.5 inches.

In a third aspect, there is provided a valve seat adapted to be disposed within a fluid cylinder for a pump assembly, the valve seat having a valve seat axis and includes a seat body, the seat body includes an enlarged-diameter portion at one end thereof, the enlarged-diameter portion includes a first tapered external shoulder, the first tapered external shoulder defining a first angle from the valve seat axis, and a frusto-conical surface extending at the first angle from the valve seat axis, the first angle ranging from about 10 degrees to about 45 degrees measured from the valve seat axis, wherein the enlarged-diameter portion defines a first cylindrical surface extending axially from the frusto-conical surface, the first cylindrical surface defining a first outside diameter, wherein the seat body defines an outside surface, the outside surface defining a second outside diameter that is less than the first outside diameter, and wherein the frusto-conical surface is axially disposed between the outside surface and the first cylindrical surface; and a bore formed through the seat body and through which fluid flows along the valve seat axis, the bore defining a second cylindrical surface, the second cylindrical surface defining an inside diameter that is less than the second outside diameter.

In an exemplary embodiment, the first angle is about 30 degrees measured from the valve seat axis.

In another exemplary embodiment, the outside surface of the seat body is tapered at a second angle from the valve seat axis; and wherein the second angle ranges from greater than 0 degrees to about 5 degrees measured from the valve seat axis.

In yet another exemplary embodiment, the valve seat includes an annular groove formed in the outside surface of the seat body, the annular groove defining a groove diameter that is less than the second outside diameter and greater than the inside diameter; and a sealing element disposed in the annular groove.

In certain exemplary embodiments, the first angle is about 30 degrees measured from the valve seat axis; wherein the first outside diameter is about 5 inches; wherein the inside diameter is about 3 inches; wherein the groove diameter is about 4 inches; and wherein the second outside diameter is about 4.5 inches.

In a fourth aspect, there is provided a valve seat adapted to be disposed within a fluid cylinder for a pump assembly, the valve seat having a valve seat axis and includes a seat body, the seat body includes an enlarged-diameter portion at one end thereof, the enlarged-diameter portion includes a first tapered external shoulder, the first tapered external shoulder defining a first angle from the valve seat axis, and a frusto-conical surface extending at the first angle from the valve seat axis, wherein the enlarged-diameter portion defines a first cylindrical surface extending axially from the frusto-conical surface, the first cylindrical surface defining a first outside diameter, wherein the seat body defines an outside surface, the outside surface defining a second outside diameter that is less than the first outside diameter, wherein the outside surface of the seat body is tapered at a second angle from the valve seat axis, and wherein the frusto-conical surface is axially disposed between the outside surface and the first cylindrical surface; and a bore formed through the seat body and through which fluid flows along the valve seat axis, the bore defining a second cylindrical surface, the second cylindrical surface defining an inside diameter that is less than the second outside diameter.

In an exemplary embodiment, the first angle ranges from about 10 degrees to about 45 degrees measured from the valve seat axis; and wherein the second angle ranges from greater than 0 degrees to about 5 degrees measured from the valve seat axis.

In another exemplary embodiment, the first angle is about 30 degrees measured from the valve seat axis; and wherein the second angle ranges from greater than 0 degrees to about 5 degrees measured from the valve seat axis.

In yet another exemplary embodiment, the valve seat includes an annular groove formed in the outside surface of the seat body, the annular groove defining a groove diameter that is less than the second outside diameter and greater than the inside diameter; and a sealing element disposed in the annular groove.

In an exemplary embodiment, the first angle is about 30 degrees measured from the valve seat axis; wherein the second angle ranges from greater than 0 degrees to about 5 degrees measured from the valve seat axis; wherein the first outside diameter is about 5 inches; wherein the inside diameter is about 3 inches; wherein the groove diameter is about 4 inches; and wherein the second outside diameter is about 4.5 inches.

In a fifth aspect, there is provided a method of producing a first pump assembly based on a second pump assembly, the first and second pump assemblies includes first and second fluid cylinders, respectively, and first and second valve seats, respectively, the first and second fluid cylinders includes first and second fluid passages formed therein, respectively, in which the first and second valve seats are adapted to be disposed, respectively, the first and second fluid passages defining first and second inside diameters, respectively, the first and second valve seats defining first and second outside diameters, respectively, the method includes producing the first fluid cylinder, includes sizing the first inside diameter to be less than the second outside diameter so that the second valve seat is not permitted to be disposed in the first fluid passage; and producing the first valve seat, includes sizing the first outside diameter so that: the first outside diameter is less than the second inside diameter; and a radial clearance would be defined between the first valve seat and an inside surface of the second fluid cylinder defined by the second fluid passage if the first valve seat were to be disposed in the second fluid passage. As a result, operational incompatibility between parts of the first and second pump assemblies is ensured and a long-term mix-up between parts is avoided.

In an exemplary embodiment, the method includes disposing the first valve seat in the first fluid passage.

In another exemplary embodiment, producing the first valve seat includes forming an enlarged-diameter portion, the enlarged-diameter portion includes a tapered external shoulder, the tapered external shoulder defining a first angle, the enlarged-diameter portion defining a cylindrical surface, the cylindrical surface defining a third outside diameter that is greater than the first outside diameter; wherein producing the first fluid cylinder includes forming the first fluid passage so that the first fluid passage defines a tapered internal shoulder, the tapered internal shoulder defining a second angle.

In yet another exemplary embodiment, producing the first valve seat further includes forming a bore through the first valve seat, the bore defining a third inside diameter that is less than the first outside diameter; forming an annular groove in the first valve seat, the annular groove defining a groove diameter that is less than the first outside diameter and greater than the third inside diameter; and disposing a sealing element in the annular groove.

In certain exemplary embodiments, the method includes disposing the first valve seat in the first fluid passage of the first cylinder so that: the tapered external shoulder engages the tapered internal shoulder, and the sealing element sealingly engages the fluid cylinder.

In other exemplary embodiments, each of the first and second angles is about 30 degrees relative to an axis; wherein the third outside diameter is about 5 inches; wherein the third inside diameter is about 3 inches; wherein the first inside diameter is about 4.5 inches; wherein the groove diameter is about 4 inches; and wherein the first outside diameter is about 4.5 inches.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

FIG. 4 is a section view of respective portions of the valve seat and the fluid cylinder, according to another exemplary embodiment.

FIG. 5 is a section view of respective portions of the valve seat and fluid cylinder, according to yet another exemplary embodiment.

FIG. 7 is a perspective view of the valve seat of FIG. 6, according to an exemplary embodiment.

FIG. 8 is a sectional view of the valve seat of FIGS. 6 and 7, according to an exemplary embodiment.

DETAILED DESCRIPTION

Figure 1:
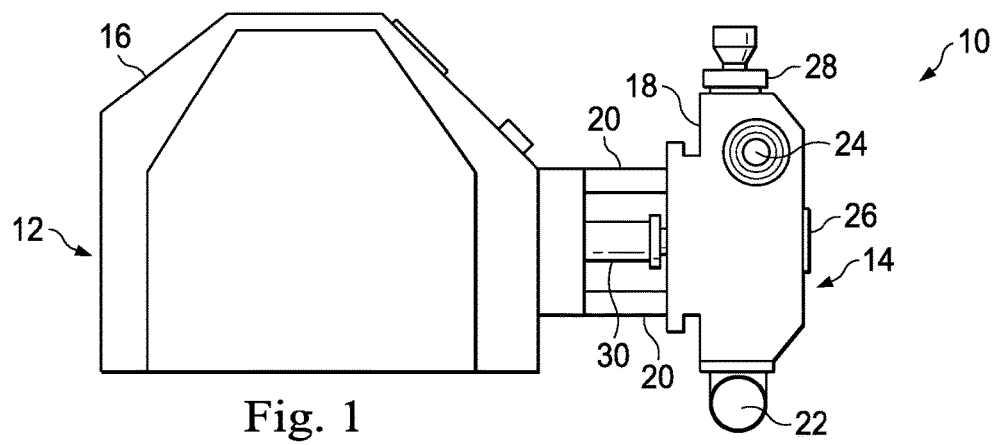
FIG. 1 is an elevational view of a reciprocating pump assembly according to an exemplary embodiment, the pump assembly includes a fluid cylinder assembly.

In an exemplary embodiment, as illustrated in FIG. 1, a reciprocating pump assembly is generally referred to by the reference numeral 10 and includes a power end portion 12 and a fluid end portion 14 operably coupled thereto. The power end portion 12 includes a housing 16 in which a crankshaft (not shown) is disposed, the crankshaft being operably coupled to an engine or motor (not shown), which is adapted to drive the crankshaft. The fluid end portion 14 includes a fluid end block or fluid cylinder 18, which is connected to the housing 16 via a plurality of stay rods 20. The fluid cylinder 18 includes a fluid inlet passage 22 and a fluid outlet passage 24, which are spaced in a parallel relation. A plurality of cover assemblies 26, one of which is shown in FIG. 1, is connected to the fluid cylinder 18 opposite the stay rods 20. A plurality of cover assemblies 28, one of which is shown in FIG. 1, is connected to the fluid cylinder 18 opposite the fluid inlet passage 22. A plunger rod assembly 30 extends out of the housing 16 and into the fluid cylinder 18. In several exemplary embodiments, the pump assembly 10 is freestanding on the ground, is mounted to a trailer that can be towed between operational sites, or is mounted to a skid.

Figure 2:
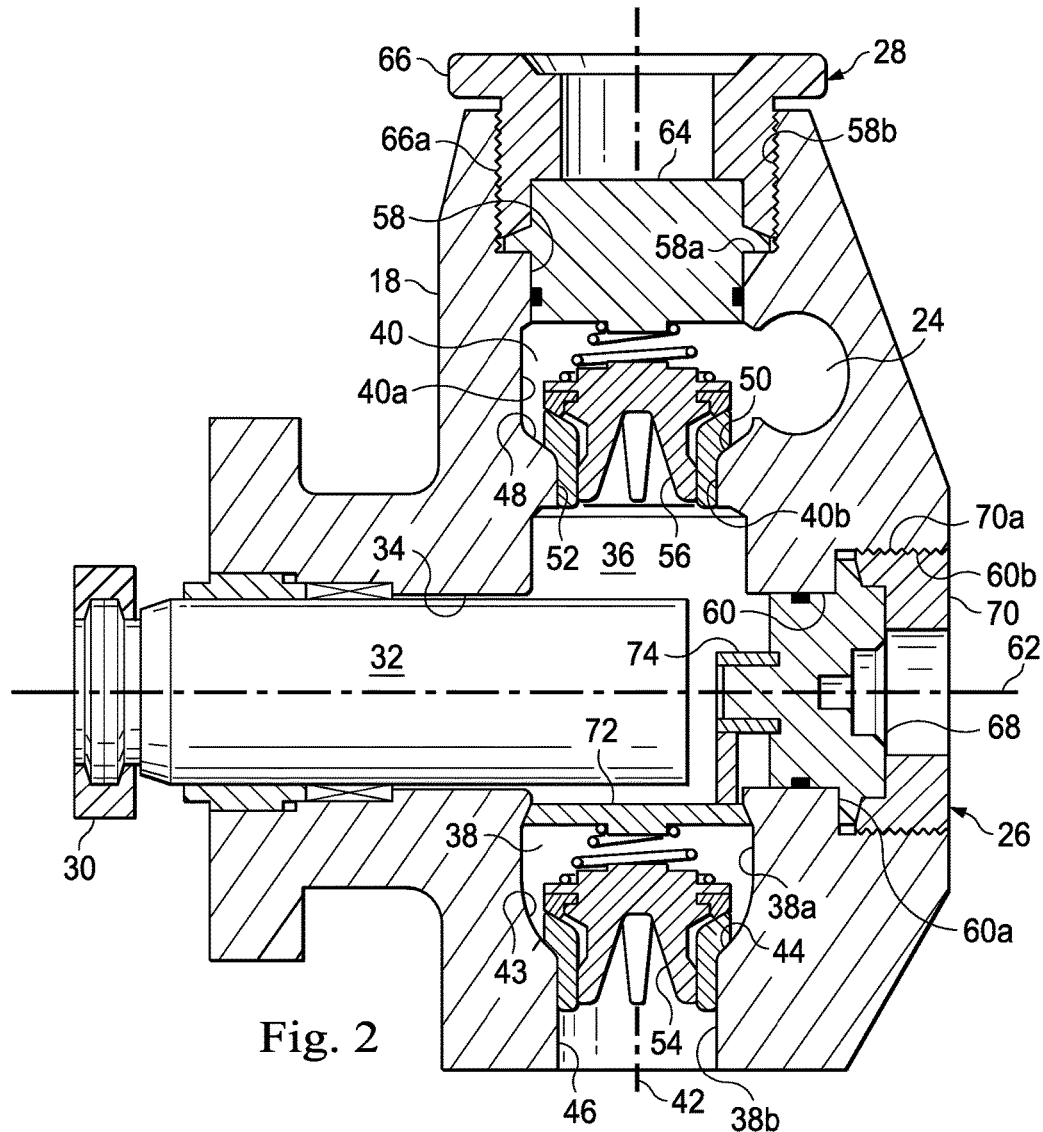
FIG. 2 is a section view of the fluid cylinder assembly of FIG. 1 according to an exemplary embodiment, the fluid cylinder assembly including a fluid cylinder and inlet and outlet valves, the inlet and outlet valves each including a valve seat.

In an exemplary embodiment, as illustrated in FIG. 2 with continuing reference to FIG. 1, the plunger rod assembly 30 includes a plunger 32, which extends through a bore 34 formed in the fluid cylinder 18, and into a pressure chamber 36 formed in the fluid cylinder 18. In several exemplary embodiments, a plurality of parallel-spaced bores may be formed in the fluid cylinder 18, with one of the bores being the bore 34, a plurality of pressure chambers may be formed in the fluid cylinder 18, with one of the pressure chambers being the pressure chamber 36, and a plurality of parallel-spaced plungers may extend through respective ones of the bores and into respective ones of the pressure chambers, with one of the plungers being the plunger 32. At least the bore 34, the pressure chamber 36, and the plunger 32 together may be characterized as a plunger throw. In several exemplary embodiments, the reciprocating pump assembly 10 includes three plunger throws (i.e., a triplex pump assembly), or includes four or more plunger throws.

As shown in FIG. 2, the fluid cylinder 18 includes inlet and outlet fluid passages 38 and 40 formed therein, which are generally coaxial along a fluid passage axis 42. Under conditions to be described below, fluid is adapted to flow through the inlet and outlet fluid passages 38 and 40 and along the fluid passage axis 42. The fluid inlet passage 22 is in fluid communication with the pressure chamber 36 via the inlet fluid passage 38. The pressure chamber 36 is in fluid communication with the fluid outlet passage 24 via the outlet fluid passage 40. The fluid inlet passage 38 includes an enlarged-diameter portion 38a and a reduced-diameter portion 38b extending downward therefrom. The enlarged-diameter portion 38a defines a tapered internal shoulder 43 and thus a frusto-conical surface 44 of the fluid cylinder 18. The reduced-diameter portion 38b defines an inside surface 46 of the fluid cylinder 18. Similarly, the fluid outlet passage 40 includes an enlarged-diameter portion 40a and a reduced-diameter portion 40b extending downward therefrom. The enlarged-diameter portion 40a defines a tapered internal shoulder 48 and thus a frusto-conical surface 50 of the fluid cylinder 18. The reduced-diameter portion 40b defines an inside surface 52 of the fluid cylinder 18.

An inlet valve 54 is disposed in the fluid passage 38, and engages at least the frusto-conical surface 44 and the inside surface 46. Similarly, an outlet valve 56 is disposed in the fluid passage 40, and engages at least the frusto-conical surface 50 and the inside surface 52. In an exemplary embodiment, each of valves 54 and 56 is a spring-loaded valve that is actuated by a predetermined differential pressure thereacross.

A counterbore 58 is formed in the fluid cylinder 18, and is generally coaxial with the fluid passage 42. The counterbore 58 defines an internal shoulder 58a and includes an internal threaded connection 58b adjacent the internal shoulder 58a. A counterbore 60 is formed in the fluid cylinder 18, and is generally coaxial with the bore 34 along an axis 62. The counterbore 60 defines an internal shoulder 60a and includes an internal threaded connection 60b adjacent the internal shoulder 60a. In several exemplary embodiments, the fluid cylinder 18 may include a plurality of parallel-spaced counterbores, one of which may be the counterbore 58, with the quantity of counterbores equaling the quantity of plunger throws included in the pump assembly 10. Similarly, in several exemplary embodiments, the fluid cylinder 18 may include another plurality of parallel-spaced counterbores, one of which may be the counterbore 60, with the quantity of counterbores equaling the quantity of plunger throws included in the pump assembly 10.

A plug 64 is disposed in the counterbore 58, engaging the internal shoulder 58a and sealingly engaging an inside cylindrical surface defined by the reduced-diameter portion of the counterbore 58. An external threaded connection 66a of a fastener 66 is threadably engaged with the internal threaded connection 58b of the counterbore 58 so that an end portion of the fastener 66 engages the plug 64. As a result, the fastener 66 sets or holds the plug 64 in place against the internal shoulder 58a defined by the counterbore 58, thereby maintaining the sealing engagement of the plug 64 against the inside cylindrical surface defined by the reduced-diameter portion of the counterbore 58. The cover assembly 28 shown in FIGS. 1 and 2 includes at least the plug 64 and the fastener 66. In an exemplary embodiment, the cover assembly 28 may be disconnected from the fluid cylinder 18 to provide access to, for example, the counterbore 58, the pressure chamber 36, the plunger 32, the fluid passage 40 or the outlet valve 56. The cover assembly 28 may then be reconnected to the fluid cylinder 18 in accordance with the foregoing. In several exemplary embodiments, the pump assembly 10 may include a plurality of plugs, one of which is the plug 64, and a plurality of fasteners, one of which is the fastener 66, with the respective quantities of plugs and fasteners equaling the quantity of plunger throws included in the pump assembly 10.

A plug 68 is disposed in the counterbore 60, engaging the internal shoulder 60a and sealingly engaging an inside cylindrical surface defined by the reduced-diameter portion of the counterbore 60. In an exemplary embodiment, the plug 68 maybe characterized as a suction cover. An external threaded connection 70a of a fastener 70 is threadably engaged with the internal threaded connection 60b of the counterbore 60 so that an end portion of the fastener 70 engages the plug 68. As a result, the fastener 70 sets or holds the plug 68 in place against the internal shoulder 60a defined by the counterbore 60, thereby maintaining the sealing engagement of the plug 68 against the inside cylindrical surface defined by the reduced-diameter portion of the counterbore 60. The cover assembly 26 shown in FIGS. 1 and 2 includes at least the plug 68 and the fastener 70. In an exemplary embodiment, the cover assembly 26 may be disconnected from the fluid cylinder 18 to provide access to, for example, the counterbore 60, the pressure chamber 36, the plunger 32, the fluid passage 38, or the inlet valve 54. The cover assembly 26 may then be reconnected to the fluid cylinder in accordance with the foregoing. In several exemplary embodiments, the pump assembly 10 may include a plurality of plugs, one of which is the plug 68, and a plurality of fasteners, one of which is the fastener 70, with the respective quantities of plugs and fasteners equaling the quantity of plunger throws included in the pump assembly 10.

A valve spring retainer 72 is disposed in the enlarged-diameter portion 38a of the fluid passage 38. The valve spring retainer 72 is connected to the end portion of the plug 68 opposite the fastener 70. In an exemplary embodiment, and as shown in FIG. 2, the valve spring retainer 72 is connected to the plug 68 via a hub 74, which is generally coaxial with the axis 62.

Figure 3:
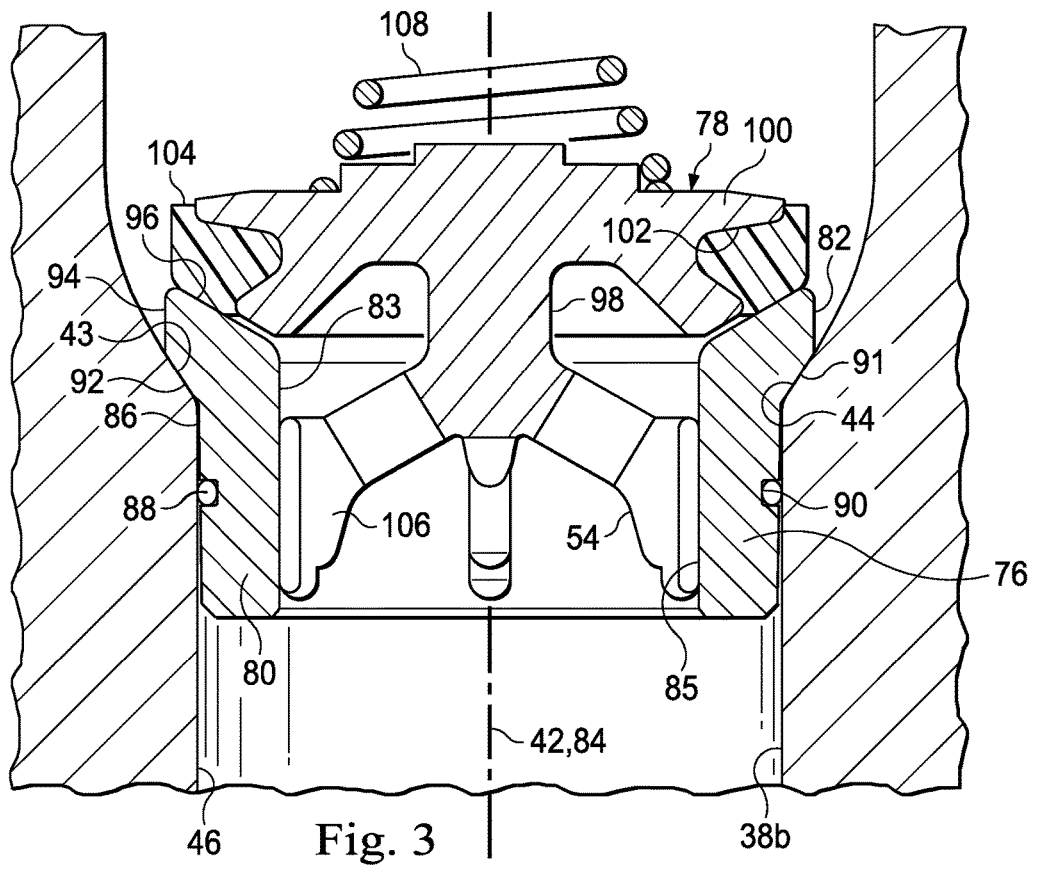
FIG. 3 is an enlarged view of a portion of the section view of FIG. 2, according to an exemplary embodiment.

In an exemplary embodiment, as illustrated in FIG. 3 with continuing reference to FIGS. 1 and 2, the inlet valve 54 includes a valve seat 76 and a valve member 78 engaged therewith. The valve seat 76 includes a seat body 80 having an enlarged-diameter portion 82 at one end thereof. The enlarged-diameter portion 82 of the seat body 80 is disposed in the enlarged-diameter portion 38a of the fluid passage 38. A bore 83 is formed through the seat body 80. The valve seat 76 has a valve seat axis 84, which is aligned with the fluid passage axis 42 when the inlet valve 54 is disposed in the fluid passage 38, as shown in FIG. 3. Under conditions to be described below, fluid flows through the bore 83 and along the valve seat axis 84. The bore 83 defines an inside surface 85 of the seat body 80. An outside surface 86 of the seat body 80 contacts the inside surface 46 defined by the fluid passage 38. A sealing element, such as an o-ring 88, is disposed in an annular groove 90 formed in the outside surface 86. The o-ring 88 sealingly engages the inside surface 46. The enlarged-diameter portion 82 includes a tapered external shoulder 91 and thus defines a frusto-conical surface 92, which extends angularly upward from the outside surface 86. The portion 82 further defines a cylindrical surface 94, which extends axially upward from the extent of the frusto-conical surface 92. The frusto-conical surface 92 is axially disposed between the outside surface 86 and the cylindrical surface 94. The portion 82 further defines a tapered surface 96, which extends angularly upward from the inside surface 85. In an exemplary embodiment, the tapered surface 96 extends at an angle from the valve seat axis 84, which angle ranges from about 15 degrees to about 45 degrees. The seat body 80 of the valve seat 76 is disposed within the reduced-diameter portion 38b of the fluid passage 38 so that the outside surface 86 of the seat body 80 engages the inside surface 46 of the fluid cylinder 18. In an exemplary embodiment, the seat body 80 forms an interference fit, or is press fit, in the portion 38b of the fluid passage 38 so that the valve seat 76 is prevented from being dislodged from the fluid passage 38.

The valve member 78 includes a central stem 98, from which a valve body 100 extends radially outward. An outside annular cavity 102 is formed in the valve body 100. A seal 104 extends within the cavity 102, and is adapted to sealingly engage the tapered surface 96 of the valve seat 76, under conditions to be described below. A plurality of circumferentially-spaced legs 106 extend angularly downward from the central stem 98, and slidably engage the inside surface 85 of the seat body 80. In several exemplary embodiments, the plurality of legs 106 may include two, three, four, five, or greater than five, legs 106. A lower end portion of a spring 108 is engaged with the top of the valve body 100 opposite the central stem 98. The valve member 78 is movable, relative to the valve seat 76 and thus the fluid cylinder 18, between a closed position (shown in FIG. 3) and an open position (not shown), under conditions to be described below.

In an exemplary embodiment, the seal 104 is molded in place in the valve body 100. In an exemplary embodiment, the seal 104 is preformed and then attached to the valve body 100. In several exemplary embodiments, the seal 104 is composed of one or more materials such as, for example, a deformable thermoplastic material, a urethane material, a fiber-reinforced material, carbon, glass, cotton, wire fibers, cloth, and/or any combination thereof. In an exemplary embodiment, the seal 104 is composed of a cloth which is disposed in a thermoplastic material, and the cloth may include carbon, glass, wire, cotton fibers, and/or any combination thereof. In several exemplary embodiments, the seal 104 is composed of at least a fiber-reinforced material, which can prevent or at least reduce delamination. In an exemplary embodiment, the seal 104 has a hardness of 95 A durometer or greater, or a hardness of 69 D durometer or greater. In several exemplary embodiments, the valve body 100 is much harder and more rigid than the seal 104.

The outlet valve 56 is identical to the inlet valve 54 and therefore will not be described in further detail. Features of the outlet valve 56 that are identical to corresponding features of the inlet valve 54 will be given the same reference numerals as that of the inlet valve 54. The valve seat axis 84 of the outlet valve 56 is aligned with each of the fluid passage axis 42 and the valve seat axis 84 of the inlet valve 54. The outlet valve 56 is disposed in the fluid passage 40, and engages the fluid cylinder 18, in a manner that is identical to the manner in which the inlet valve 54 is disposed in the fluid passage 38, and engages the fluid cylinder 18, with one exception. This one exception involves the spring 108 of the outlet valve 56; more particularly, the upper portion of the spring 108 of the outlet valve 56 is compressed against the bottom of the plug 64, rather than being compressed against a component that corresponds to the valve spring retainer 72, against which the upper portion of the spring 108 of the inlet valve 54 is compressed.

In operation, in an exemplary embodiment, with continuing reference to FIGS. 1-3, the plunger 32 reciprocates within the bore 34, reciprocating in and out of the pressure chamber 36. That is, the plunger 32 moves back and forth horizontally, as viewed in FIG. 2, away from and towards the fluid passage 42. In an exemplary embodiment, the engine or motor (not shown) drives the crankshaft (not shown) enclosed within the housing 16, thereby causing the plunger 32 to reciprocate within the bore 34 and thus in and out of the pressure chamber 36.

As the plunger 32 reciprocates out of the pressure chamber 36, the inlet valve 54 is opened. More particularly, as the plunger 32 moves away from the fluid passage 42, the pressure inside the pressure chamber 36 decreases, creating a differential pressure across the inlet valve 54 and causing the valve member 78 to move upward, as viewed in FIGS. 2 and 3, relative to the valve seat 76 and the fluid cylinder 18. As a result of the upward movement of the valve member 78, the spring 108 is compressed between the valve body 100 and the valve spring retainer 72, the seal 104 disengages from the tapered surface 96, and the inlet valve 54 is thus placed in its open position. Fluid in the fluid inlet passage 22 flows along the fluid passage axis 42 and through the fluid passage 38 and the inlet valve 54, being drawn into the pressure chamber 36. To flow through the inlet valve 54, the fluid flows through the bore 83 of the valve seat 76 and along the valve seat axis 84. During the fluid flow through the inlet valve 54 and into the pressure chamber 36, the outlet valve 56 is in its closed position, with the seal 104 of the valve member 78 of the outlet valve 56 engaging the tapered surface 96 of the valve seat 76 of the outlet valve 56. Fluid continues to be drawn into the pressure chamber 36 until the plunger 32 is at the end of its stroke away from the fluid passage 42. At this point, the differential pressure across the inlet valve 54 is such that the spring 108 of the inlet valve 54 is not further compressed, or begins to decompress and extend, forcing the valve member 78 of the inlet valve 54 to move downward, as viewed in FIGS. 2 and 3, relative to the valve seat 76 and the fluid cylinder 18. As a result, the inlet valve 54 is placed in, or begins to be placed in, its closed position, with the seal 104 sealingly engaging, or at least moving towards, the tapered surface 96.

As the plunger 32 moves into the pressure chamber 36 and thus towards the fluid passage 42, the pressure within the pressure chamber 36 begins to increase. The pressure within the pressure chamber 36 continues to increase until the differential pressure across the outlet valve 56 exceeds a predetermined set point, at which point the outlet valve 56 opens and permits fluid to flow out of the pressure chamber 36, along the fluid passage axis 42 and through the fluid passage 40 and the outlet valve 56, and into the fluid outlet passage 24. As the plunger 32 reaches the end of its stroke towards the fluid passage 42 (i.e., its discharge stroke), the inlet valve 54 is in, or is placed in, its closed position, with the seal 104 sealingly engaging the tapered surface 96.

The foregoing is repeated, with the reciprocating pump assembly 10 pressurizing the fluid as the fluid flows from the fluid inlet passage 22 and to the fluid outlet passage 24 via the pressure chamber 36. In an exemplary embodiment, the pump assembly 10 is a single-acting reciprocating pump, with fluid being pumped across only one side of the plunger 32.

In an exemplary embodiment, during the above-described operation of the reciprocating pump assembly 10, the taper of each of the surfaces 44 and 92 balances the loading forces applied thereagainst. In an exemplary embodiment, the loading is distributed across the surface 44 and 92, reducing stress concentrations. In an exemplary embodiment, the stresses in the valve seat 76, in the vicinity of the fillet interface between the surfaces 86 and the 92, are balanced with the stresses in the fluid cylinder 18, in the vicinity of the round interface between the surfaces 46 and 44. As a result, these stresses are reduced. In an exemplary embodiment, the taper of each of the surfaces 44 and 92 permits the outside diameter of the seat body 80 of the inlet valve 54 to be reduced, thereby also permitting a relative smaller service port, as well relatively smaller cross-bore diameters within the fluid cylinder 18. In an exemplary embodiment, the taper of each of the surfaces 44 and 92 reduces the extraction force necessary to remove the valve seat 76 from the fluid passage 38.

In an exemplary embodiment, as illustrated in FIG. 4 with continuing reference to FIGS. 1-3, a taper angle 110 is defined by the tapered external shoulder 91 and thus the frusto-conical surface 92. A taper angle 112 is defined by the tapered internal shoulder 43 and thus the frusto-conical surface 44. Each of the taper angles 110 and 112 may be measured from the fluid passage axis 42 and the valve seat axis 84 aligned therewith. In an exemplary embodiment, the taper angles 110 and 112 are equal, and range from about 10 degrees to about 45 degrees measured from the fluid passage axis 42 and the valve seat axis 84 aligned therewith. In an exemplary embodiment, the taper angles 110 and 112 range from about 20 degrees to 40 degrees measured from the fluid passage axis 42 and the valve seat axis 84 aligned therewith. In an exemplary embodiment, the taper angles 110 and 112 range from about 25 to 35 degrees measured from the fluid passage axis 42 and the valve seat axis 84 aligned therewith. In an exemplary embodiment, the taper angles 110 and 112 are equal, and each of the taper angles 110 and 112 is about 30 degrees measured from the fluid passage axis 42 and the valve seat axis 84 aligned therewith. In an exemplary embodiment, the taper angles 110 and 112 are not equal. As shown in FIG. 4, a frusto-conical gap or region 114 may be defined between the surfaces 44 and 92. Moreover, a radial clearance 116 is defined between the outside cylindrical surface 94 of the valve seat 76 and an inside surface 118 of the fluid cylinder 18, the surface 118 being defined by the enlarged-diameter portion 38a of the fluid passage 38. In an exemplary embodiment, the region 114 may be omitted and the surface 92 may abut the surface 44. In an exemplary embodiment, material may be disposed in the region 114 to absorb, transfer and/or distribute loads between the surfaces 44 and 92.

As shown in FIG. 4, at least the end portion of the body 80 opposite the enlarged-diameter portion 82 is tapered at a taper angle 120 from the fluid passage axis 42 and the valve seat axis 84 aligned therewith. In an exemplary embodiment, the taper angle 120 ranges from about 0 degrees to about 5 degrees measured from the fluid passage axis 42 and the valve seat axis 84 aligned therewith. In an exemplary embodiment, the taper angle 120 ranges from about 1 degree to about 4 degrees measured from the fluid passage axis 42 and the valve seat axis 84 aligned therewith. In an exemplary embodiment, the taper angle 120 ranges from about 1 degree to about 3 degrees measured from the fluid passage axis 42 and the valve seat axis 84 aligned therewith. In an exemplary embodiment, the taper angle 120 is about 2 degrees measured from the fluid passage axis 42 and the valve seat axis 84 aligned therewith. In an exemplary embodiment, the taper angle 120 is about 1.8 degrees measured from the fluid passage axis 42 and the valve seat axis 84 aligned therewith. In an exemplary embodiment, instead of, or in addition to the end portion of the body 80 opposite the enlarged-diameter portion 82 being tapered, the inside surface 46 of the fluid cylinder 18 is tapered at the taper angle 120. In an exemplary embodiment, an interference fit may be formed between the body 80 and the inside surface 46, thereby holding the valve seat 76 in place in the fluid cylinder. In several exemplary embodiments, instead of using an interference fit in the fluid passage 38, a threaded connection, a threaded nut, and/or a snap-fit mechanism may be used to hold the valve seat 76 in place in the fluid cylinder 18.

In an exemplary embodiment, during operation of the pump assembly 10 using the embodiment of the inlet valve 54 illustrated in FIG. 4, the surfaces 92 and 44 provide load balancing, with loading on the enlarged-diameter portion 82 of the valve seat 76 being distributed and transferred to the surface 44 of the fluid cylinder 18, via either the pressing of the surface 92 against the surface 44 or intermediate material(s) disposed therebetween.

In an exemplary embodiment, as illustrated in FIG. 5 with continuing reference to FIGS. 1-4, a fillet surface 122 of the fluid cylinder 18 is defined by the enlarged-diameter portion 38a of the fluid passage 38. The fillet surface 122 extends between the frusto-conical surface 44 and the inside surface 118. As shown in FIG. 5, each of the frusto-conical surfaces 92 and 44 is tapered at a taper angle 123, which may be measured from the fluid passage axis 42 and the valve seat axis 84 aligned therewith. In an exemplary embodiment, the taper angle 123 ranges from about 10 degrees to about 45 degrees measured from the fluid passage axis 42 and the valve seat axis 84 aligned therewith. In an exemplary embodiment, the taper angle 123 ranges from about greater than 10 degrees to about 30 degrees measured from the fluid passage axis 42 and the valve seat axis 84 aligned therewith. In an exemplary embodiment, the taper angle 123 ranges from about 12 degrees to about 20 degrees measured from the fluid passage axis 42 and the valve seat axis 84 aligned therewith. In an exemplary embodiment, the taper angle 123 is about 14 degrees measured from the fluid passage axis 42 and the valve seat axis 84 aligned therewith. In an exemplary embodiment, the surface 92 and 44 may be tapered at respective angles that are not equal. The surface 92 abuts the surface 44. As shown in FIG. 5, the groove 90 and the o-ring 88 are omitted in favor of an annular groove 124 and an o-ring 126, respectively. The annular groove 124 is formed in the frusto-conical surface 92, and the o-ring 126 is disposed in the annular groove 124. The o-ring 126 sealingly engages the frusto-conical surface 44.

In an exemplary embodiment, during operation of the pump assembly 10 using the embodiment of the inlet valve 54 illustrated in FIG. 5, loads applied to the valve seat 76 are distributed and transferred to the fluid cylinder 18 via, at least in part, the load balancing provided by the abutment of the surface 92 against the surface 44.

In an exemplary embodiment, during operation of the pump assembly 10 using any of the foregoing embodiments of the inlet valve 54, downwardly directed axial loads along the fluid passage 42 are applied against the top of the valve body 100. This loading is usually greatest as the plunger 32 moves towards the fluid passage 42 and the outlet valve 56 opens and permits fluid to flow out of the pressure chamber 36, through the fluid passage 40 and the outlet valve 56, and into the fluid outlet passage 24. As the plunger 32 reaches the end of its stroke towards the fluid passage 42 (its discharge stroke), the inlet valve 54 is in, or is placed in, its closed position, and the loading applied to the top of the valve body 100 is transferred to the seal 104 via the valve body 100. The loading is then transferred to the valve seat 76 via the seal 104, and then is distributed and transferred to the tapered internal shoulder 43 of the fluid cylinder 18 via either the engagement of the surface 92 against the surface 44 or intermediate material(s) disposed therebetween. The tapering of the surfaces 92 and 44 facilitates this distribution and transfer of the downwardly directed axial loading to the fluid cylinder 18 in a balanced manner, thereby reducing stress concentrations in the fluid cylinder 18 and the valve seat 76.

Figure 6:
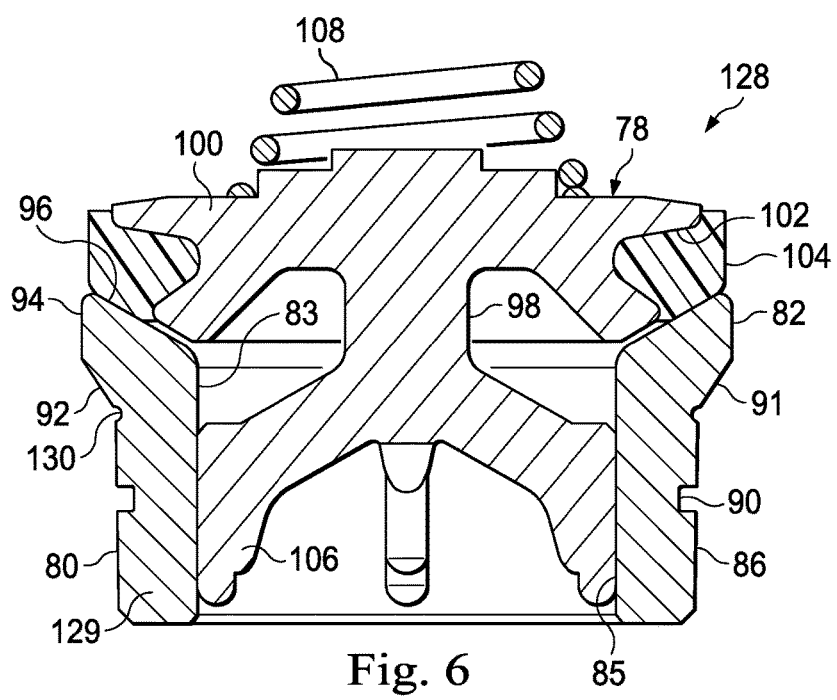
FIG. 6 is a section view of a valve according to another exemplary embodiment, the valve including a valve seat.

In an exemplary embodiment, as illustrated in FIGS. 6-8 with continuing reference to FIGS. 1-5, an inlet valve is generally referred to by the reference numeral 128 and includes several parts that are identical to corresponding parts of the inlet valve 54, which identical parts are given the same reference numerals. The inlet valve 128 includes a valve seat 129. The valve seat 129 includes several features that are identical to corresponding features of the valve seat 76, which identical features are given the same reference numerals. An annular notch 130 is formed in the valve seat 128 at the intersection of the surfaces 86 and 92.

As shown in FIG. 8, a taper angle 132 is defined by the external tapered shoulder 93 and thus the frusto-conical surface 94. The taper angle 132 may be measured from the valve seat axis 84. In an exemplary embodiment, the taper angle 132 is about 30 degrees measured from the valve seat axis 84. In an exemplary embodiment, the taper angle 132 ranges from about 10 degrees to about 45 degrees measured from the valve seat axis 84. In an exemplary embodiment, the taper angle 132 ranges from about 20 degrees to about 40 degrees measured from the valve seat axis 84. In an exemplary embodiment, the taper angle 132 ranges from about 25 to about 35 degrees measured from the valve seat axis 84. The cylindrical surface 94 defined by the enlarged-diameter portion 82 of the valve seat 129 defines an outside diameter 134. In an exemplary embodiment, the outside diameter 134 is about 5 inches. In an exemplary embodiment, the outside diameter 134 is about 5.06 inches. The inside surface 85 of the seat body 80 defined by the bore 83 formed therethrough defines an inside diameter 136. In an exemplary embodiment, the inside diameter 136 ranges from about 3 inches to about 3.5 inches. In an exemplary embodiment, the inside diameter 136 is about 3.27 inches. An annular surface 138 of the seat body 80 is defined by the annular groove 90. A groove diameter 140 is defined by the annular surface 138. In an exemplary embodiment, the groove diameter 140 ranges from about 4 inches to about 4.5 inches. In an exemplary embodiment, the groove diameter 140 is about 4.292 inches. In an exemplary embodiment, an outside diameter 142 is defined by the outside surface 86 of the seat body 80 at an axial location therealong adjacent the annular notch 130, or at least in the vicinity of the intersection between the surfaces 86 and 92. In an exemplary embodiment, the outside diameter 142 ranges from about 4 inches to about 5 inches. In an exemplary embodiment, the outside diameter 142 ranges from about 4.5 inches to about 5 inches. In an exemplary embodiment, the outside diameter 142 ranges from about 4.5 inches to about 4.6 inches. In an exemplary embodiment, the outside diameter 142 is about 4.565 inches. The outside surface 86 is tapered radially inward beginning at the axial location of the outside diameter 142 and ending at the end of the body 80 opposite the enlarged-diameter portion 82, thereby defining a taper angle 144 from the valve seat axis 84. In an exemplary embodiment, the taper angle 144 ranges from about 0 degrees to about 5 degrees measured from the valve seat axis 84. In an exemplary embodiment, the taper angle 144 ranges from greater than 0 degrees to about 5 degrees measured from the valve seat axis 84. In an exemplary embodiment, the taper angle 120 is about 2 degrees measured from the valve seat axis 84. In an exemplary embodiment, the taper angle 144 is about 1.8 degrees measured from the valve seat axis 84.

Figure 9:
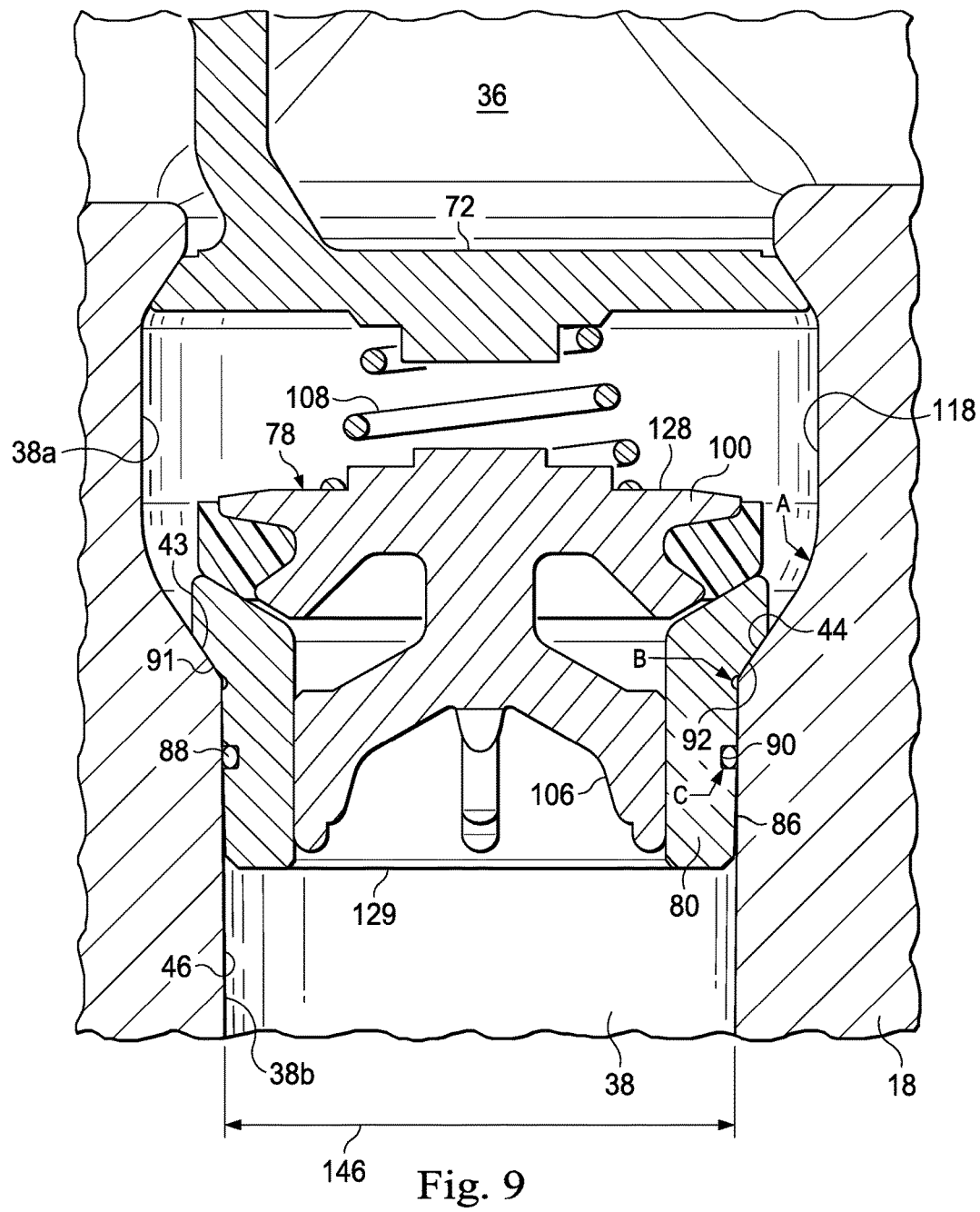
FIG. 9 is a sectional view of the valve of FIG. 6 disposed within the fluid cylinder of FIG. 2, according to an exemplary embodiment.

In an exemplary embodiment, as illustrated in FIG. 9 with continuing reference to FIGS. 1-8, the inlet valve 54 is omitted from the pump assembly 10 in favor of the inlet valve 128, which is disposed in the fluid passage 38. The tapered external shoulder 91 of the valve seat 129 engages the tapered internal shoulder 43 of the fluid cylinder 18. Thus, the frusto-conical surface 92 engages the frusto-conical surface 44. In an exemplary embodiment, the tapered internal shoulder 43 defines a taper angle from the fluid passage axis 42 that is equal to the taper angle 132. In an exemplary embodiment, the tapered internal shoulder 43 defines a taper angle that is equal to the taper angle 132, and the taper angle 132 ranges from about 10 degrees to about 45 degrees measured from the valve seat axis 84. In an exemplary embodiment, the tapered angle 132 ranges from about 20 degrees to 45 degrees measured from the valve seat axis 84. In an exemplary embodiment, the tapered angle 132 ranges from about 25 degrees to 35 degrees measured from the valve seat axis 84. In an exemplary embodiment, the tapered internal shoulder 43 defines a taper angle that is equal to the taper angle 132, and the taper angle 132 is about 30 degrees measured from the valve seat axis 84. The o-ring 88 sealingly engages the inside surface 46 of the fluid cylinder 18. The outside surface 86 of the body 80 of the valve seat 129 of the inlet valve 128 engages the inside surface 46 of the fluid cylinder 18. In an exemplary embodiment, at least the reduced-diameter portion 38b of the fluid passage 38 is tapered such that an inside diameter 146 defined by the portion 38b decreases along the fluid passage 42 in an axial direction away from the enlarged-diameter portion 38a. In an exemplary embodiment, at an axial location corresponding to the intersection between the surfaces 46 and 44, the inside diameter 146 ranges from about 4 inches to about 5 inches. In an exemplary embodiment, at an axial location corresponding to the intersection between the surfaces 46 and 44, the inside diameter 146 ranges from about 4.5 inches to about 5 inches. In an exemplary embodiment, at an axial location corresponding to the intersection between the surfaces 46 and 44, the inside diameter 146 ranges from about 4.5 inches to about 4.6 inches. In an exemplary embodiment, at an axial location corresponding to the intersection between the surfaces 46 and 44, the inside diameter 146 is about 4.553 inches. In an exemplary embodiment, an interference fit is formed between the outside surface 86 and the inside surface 46, thereby preventing the valve seat 129 from being dislodged from the fluid passage 38.

In an exemplary embodiment, the operation of the inlet valve 129 during the operation of the pump assembly 10 is identical to the operation of the inlet valve 54. Therefore, the operation of the inlet valve 129 during the operation of the pump assembly 10 will not be described in detail.

In an exemplary embodiment, the inlet valve 54 may be omitted from the pump assembly 10 in favor of the inlet valve 128, and the outlet valve 56 may be omitted from the pump assembly 10 in favor of an outlet valve that is identical to the inlet valve 128. In an exemplary embodiment, the operation of the pump assembly 10 using the inlet valve 128, and an outlet valve that is identical to the inlet valve 128, is identical to the above-described operation of the pump assembly 10 using the inlet valve 54 and the outlet valve 56.

In several experimental exemplary embodiments, experimental finite element analyses were conducted on an Experimental Baseline Embodiment (simulating a previous pump assembly that may be referred to as Legacy or the Legacy model) of a combination of the valve seat 129 and the fluid cylinder 18, and also on three Experimental Exemplary Embodiments of combinations of the valve seat 129 and the fluid cylinder 18. Experimental stresses were determined at three points in each of the Experimental Exemplary Embodiments 1, 2 and 3, which points are shown in FIG. 9, namely Point A, which is on the fluid cylinder 18 at about the intersection between the surfaces 44 and 118; Point B, which is on the valve seat 129 at about the nadir defined by the annular notch 130; and Point C, which is on the valve seat 129 at about the intersection between the axially-extending surface of the fluid cylinder 18 defined by the annular groove 90 and the lower radially-extending surface of the fluid cylinder 18 defined by the annular groove 90.

For the Experimental Baseline Embodiment, the taper angle 132 was 90 degrees, the inside diameter 136 was 3.27 inches, and the outside diameter 134 was 5.06 inches. For Experimental Exemplary Embodiments 1, 2 and 3, the taper angle 132 was 30 degrees, the inside diameter 136 was 3.27 inches, and the outside diameter 134 was 5.06 inches. These values correspond to the plunger 32 being a 4.5-inch plunger, that is, the plunger 32 having an outside diameter of about 4.5 inches. Additional dimensions of the Experimental Exemplary Embodiments are set forth in Table I below (these values also correspond to the plunger 32 being a 4.5-inch plunger):

TABLE I

| Dimensions | | | | |
|---|---|---|---|---|
| | Experimental Baseline Embodiment | Experimental Exemplary Embodiment 1 | Experimental Exemplary Embodiment 2 | Experimental Exemplary Embodiment 3 |
| Inside diameter 146 (inches) | 4.641 | 4.641 | 4.596 | 4.553 |
| Groove diameter 140 (inches) | 4.380 | 4.380 | 4.335 | 4.292 |
| Outside diameter 142 (inches) | 4.653 | 4.653 | 4.608 | 4.565 |

The stress response results of the experimental finite element analyses, under a simulated condition corresponding to the pressure chamber 36 being pressurized at 16,800 psi, are set forth in Table II below:

TABLE II

| Stress Responses at 16,800 psi | | | | |
|---|---|---|---|---|
| | Experimental Baseline Embodiment | Experimental Exemplary Embodiment 1 | Experimental Exemplary Embodiment 2 | Experimental Exemplary Embodiment 3 |
| Von-mises stress - Point A (psi) | 58,632.6 | 41,860.4 | 41,754.2 | 41,658.5 |
| Von-mises stress - Point B (psi) | 106,517 | 59,282.6 | 58,571.6 | 58,312.3 |
| Von-mises stress - Point C (psi) | 52,330 | 81,584.5 | 81,849.1 | 81,216.9 |
| 1st principal stress - Point A (psi) | 49,716.1 | 26,393.5 | 26,148.7 | 25,944.3 |
| 1st principal stress - Point B (psi) | 86,958.5 | 22,320.2 | 20,384.6 | 19,046.2 |

The stress response results of the experimental finite element analyses, under a simulated condition corresponding to the pressure chamber 36 being pressurized at 19,286 psi, are set forth in Table III below:

TABLE III

| Stress Responses at 19,286 psi | | | | |
|---|---|---|---|---|
| | Experimental Baseline Embodiment | Experimental Exemplary Embodiment 1 | Experimental Exemplary Embodiment 2 | Experimental Exemplary Embodiment 3 |
| Von-mises stress - Point A (psi) | 69,340.0 | 47,815.8 | 47,697.2 | 47,591.5 |

TABLE III-continued

Stress Responses at 19,286 psi

| | Experimental Baseline Embodiment | Experimental Exemplary Embodiment 1 | Experimental Exemplary Embodiment 2 | Experimental Exemplary Embodiment 3 |
|---|---|---|---|---|
| Von-mises stress - Point B (psi) | 123,150 | 77,791.6 | 76,387.5 | 75,565.0 |
| Von-mises stress - Point C (psi) | 50,763 | 76,511.0 | 77,434.2 | 77,433.5 |
| 1st principal stress - Point A (psi) | 59,885.5 | 29,796.5 | 29,546.8 | 29,340.3 |
| 1st principal stress - Point B (psi) | 110,138 | 42,530.0 | 39,977.6 | 38,101.2 |

As indicated in Tables II and III above, as the experimental outside diameter 142 of the experimental valve seat 129 was reduced, the experimental stress responses decreased. This was an unexpected result. The decreases in experimental stress responses for Points B and A on the Experimental Exemplary Embodiments of the valve seat 129 were unexpected because it was expected that, as the cross-sectional area of the valve seat 129 (corresponding to a cross-section of the body 80 that is below the enlarged-diameter portion 82 and is perpendicular to the valve seat axis 84) decreased, the stress responses at Points B and A would increase. Unexpected experimental results were achieved with the taper angle 132 being about 30 degrees, the outside diameter 134 being about 5 inches, the inside diameter 136 being about 3 inches, the groove diameter being about 4 inches, and, unexpectedly, the outside diameter 142 being less than 4.6 inches. Based on these unexpected results, it was determined that a new pump assembly 10 could be produced based on the pump assembly 10, with the diameters 146, 140 and 142 of the new pump assembly 10 being sufficiently less than the diameters 146, 140 and 142 of the previous pump assembly 10 so that the valve seat 129 of the new pump assembly 10 would not be operationally compatible with the fluid cylinder 18 of the previous pump assembly 10, and so that the valve seat 129 of the previous pump assembly 10 would not be operationally compatible with the fluid cylinder 18 of the new pump assembly 10, thereby preventing any mix-up of parts between the new and previous pump assemblies 10. These goals of operational incompatibility and long-term mix-up prevention could be achieved while unexpectedly improving the stress responses of the new pump assembly 10.

Figure 10:
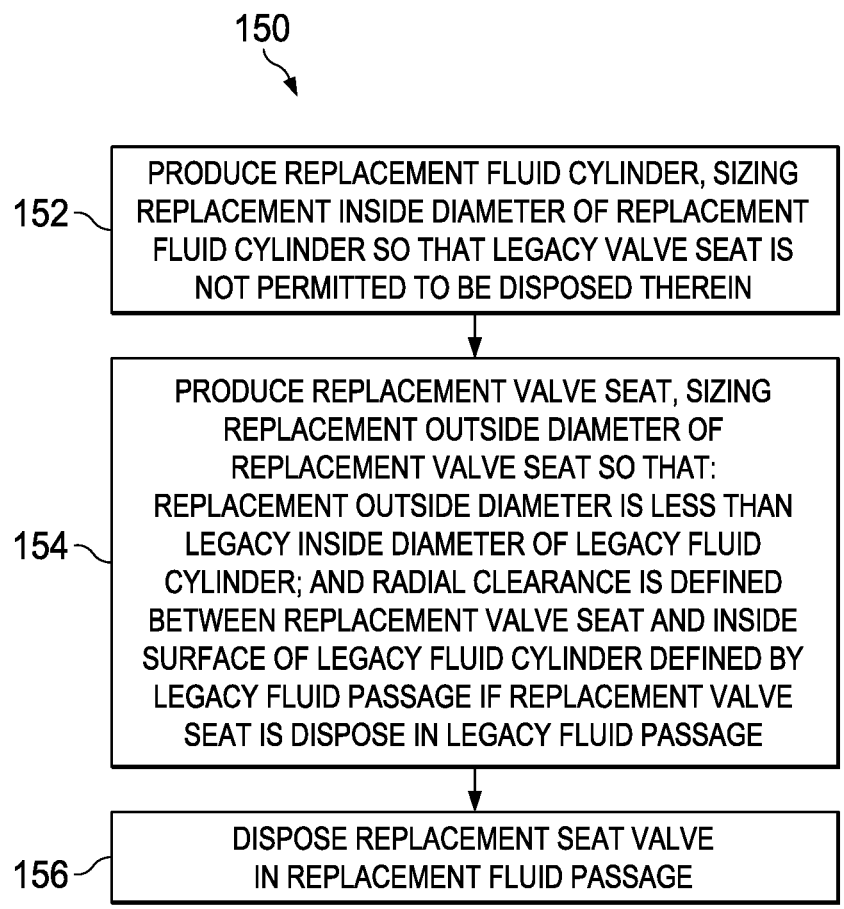
FIG. 10 is a flow chart illustration of a method of producing a new pump assembly based on a previously sold pump assembly referred to as Legacy or the Legacy model, according to an exemplary embodiment.

In an exemplary embodiment, as illustrated in FIG. 10 with continuing reference to FIGS. 1-9, a method of producing a new pump assembly based on the previous pump assembly is generally referred to by the reference numeral 150 and referred to herein as Legacy or the Legacy model. The method 150 includes a step 152 at which a replacement fluid cylinder is produced, the replacement fluid cylinder including a replacement fluid passage formed therein, the replacement fluid passage defining a replacement inside diameter. The step 152 includes sizing the replacement inside diameter so that a valve seat sized and shaped for the Legacy pump assembly is not permitted to be disposed in the replacement fluid passage. Since the Legacy valve seat is not permitted to be disposed in the replacement fluid passage, the parts are operationally incompatible and a mix-up of the parts is avoided. At step 154, a replacement valve seat is produced, the replacement valve seat defining a replacement outside diameter. The step 154 includes sizing the replacement outside diameter so that the replacement outside diameter is less than a Legacy inside diameter defined by a Legacy fluid passage formed in a Legacy fluid cylinder of the Legacy model pump assembly, and so that a radial clearance is defined between the replacement valve seat and an inside surface of the Legacy fluid cylinder defined by the Legacy fluid passage if the replacement valve seat is disposed in the Legacy fluid passage. As a result, if the replacement valve seat is disposed in the Legacy fluid passage and the Legacy pump assembly is subsequently operated, the Legacy pump assembly will not be able to hold pressure and this pressure deficiency will be quickly and easily detected, prompting troubleshooting and the detection of the operational incompatibility, and mix-up, of the parts. Thus, a long-term mix-up of the parts is avoided. At step 156, the replacement valve seat is disposed in the replacement fluid passage of the replacement fluid cylinder. In several exemplary embodiments, the method 150 includes additional steps in which the replacement pump assembly is assembled in accordance with the foregoing description of the pump assembly 10. In several exemplary embodiments, each of the replacement and Legacy fluid cylinders may be identical to the fluid cylinder 18 as illustrated in FIG. 9, and each of the replacement and Legacy valve seats may be identical to the valve seat 129 as illustrated in FIGS. 8 and 9, with at least two exceptions. First, the inside diameter 146 of the replacement fluid cylinder is less than the outside diameter 142 of the Legacy valve seat so that the Legacy valve seat is not permitted to be disposed in the portion 38b of the fluid passage 38 of the replacement fluid cylinder. Second, the outside diameter 142 of the replacement valve seat is less than the inside diameter 146 of the Legacy fluid cylinder so that a radial clearance is defined between the surface 86 of the replacement valve seat and the inside surface 46 of the Legacy fluid cylinder.

Figure 11:
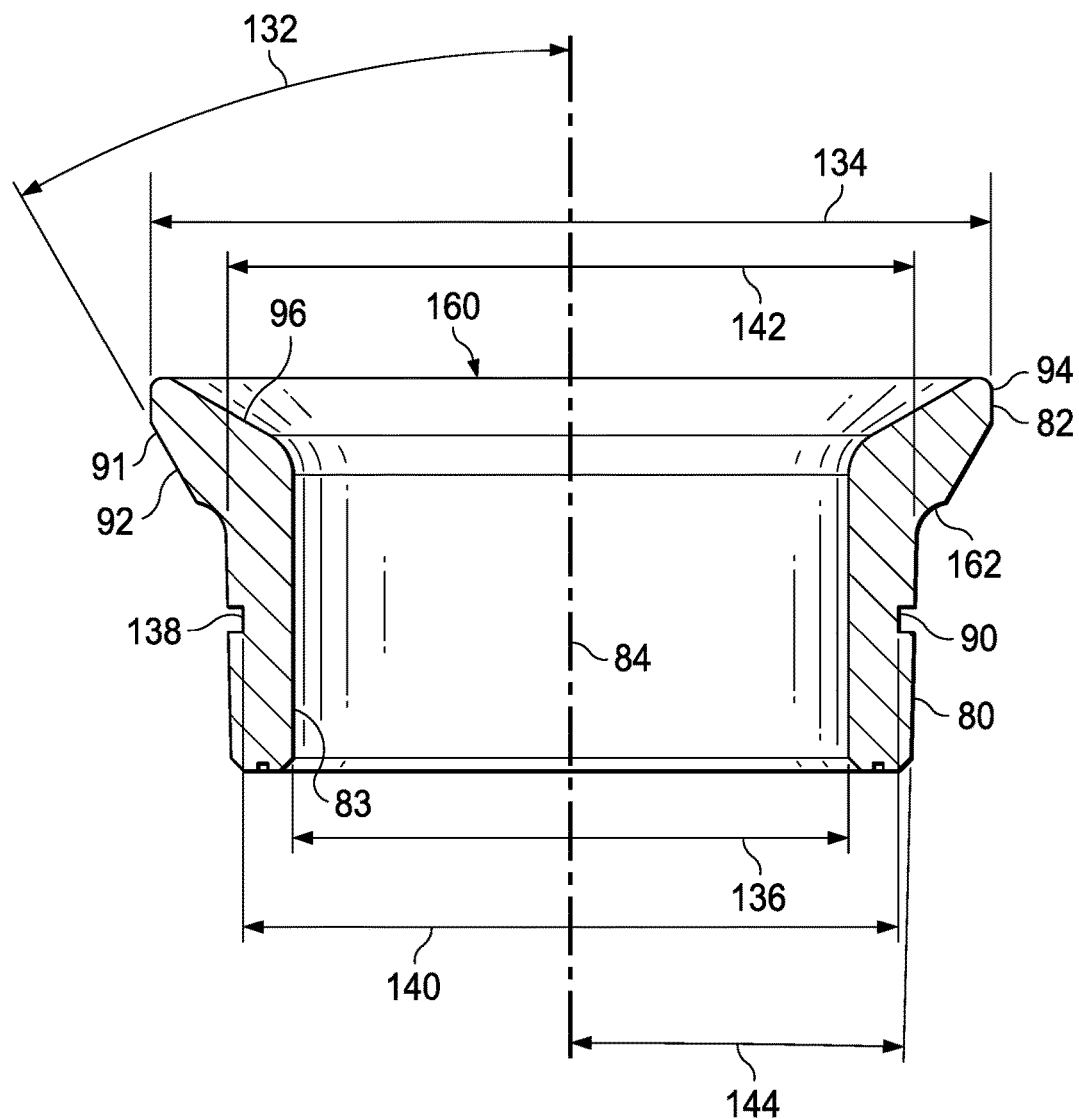
FIG. 11 is a sectional view of a valve seat, according to another exemplary embodiment.

In an exemplary embodiment, as illustrated in FIG. 11 with continuing reference to FIGS. 1-10, a valve seat is generally referred to by the reference numeral 160 and includes several features that are identical to corresponding features of the valve seat 129, which identical features are given the same reference numerals. The annular notch 130 of the valve seat 129 is omitted in favor of an annular channel 162. In an exemplary embodiment, the taper angle 132 is about 30 degrees measured from the axis 84. In an exemplary embodiment, the outside diameter 134 is about 4.5 inches. In an exemplary embodiment, the inside diameter 136 is about 3 inches. In an exemplary embodiment, the groove diameter 140 is about 3.5 inches. In an exemplary embodiment, the outside diameter 142 is about 3.5 inches. In an exemplary embodiment, the taper angle 144 is about 1.8 degrees measured from the axis 84. In an exemplary embodiment, the taper angle 132 ranges from about 10 degrees to about 45 degrees measured from the axis 84. In an exemplary embodiment, the outside diameter 134 ranges from about 4 inches to about 5 inches. In an exemplary embodiment, the inside diameter 136 ranges from about 2.5 inches to about 3.5 inches. In an exemplary embodiment, the groove diameter 140 ranges from about 3 inches to about 4 inches. In an exemplary embodiment, the outside diameter 142 ranges from about 3 inches to about 4 inches. In an exemplary embodiment, the taper angle 144 ranges from greater than 0 degrees to about 5 degrees. In several exemplary embodiments, the valve seat 129 may be used in one or more of the valves 54, 56 and 128.

In several exemplary embodiments, variations may be made to the valve member 100, or the valve member 100 may be omitted in favor of another valve member that does not include the plurality of legs 106. In several exemplary embodiments, the valves 54, 56 and 128 may be configured to operate in the presence of highly abrasive fluids, such as drilling mud, and at relatively high pressures, such as at pressures of up to about 15,000 psi or greater. In several exemplary embodiments, instead of, or in addition to being used in reciprocating pumps, the valves 54, 56 and 128 or the components thereof, such as the valve seats 76, 129 and 160, may be used in other types of pumps and fluid systems. Correspondingly, instead of, or in addition to being used in reciprocating pumps, the fluid cylinder 18 or features thereof may be used in other types of pumps and fluid systems.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A valve seat adapted to be disposed within a fluid cylinder for a pump assembly, the valve seat having a valve seat axis, the valve seat comprising:

a seat body, the seat body comprising an enlarged-diameter portion at one end thereof, the enlarged-diameter portion comprising a tapered external shoulder, the tapered external shoulder defining a frusto-conical surface extending at a first angle from the valve seat axis,
wherein the enlarged-diameter portion defines a first cylindrical surface extending axially from the frusto-conical surface, the first cylindrical surface defining a first outside diameter,
wherein the seat body defines an outside surface, the outside surface defining a second outside diameter that is less than the first outside diameter, and
wherein the frusto-conical surface is axially disposed between the outside surface and the first cylindrical surface;
and
a bore formed through the seat body, the bore defining a second cylindrical surface, the second cylindrical surface defining an inside diameter that is less than the second outside diameter;
wherein the second outside diameter is less than 4.6 inches;
wherein the inside diameter is greater than or equal to 3 inches and less than or equal to 3.5 inches;
wherein the first angle is greater than or equal to 25 degrees and less than or equal to 35 degrees measured from the valve seat axis; and
wherein the enlarged-diameter portion of the seat body further defines a tapered inside surface, the tapered inside surface extending at a second angle from the valve seat axis.

2. The valve seat of claim 1, further comprising:
an annular groove formed in the outside surface of the seat body, the annular groove defining a groove diameter that is less than the second outside diameter and greater than the inside diameter; and
a sealing element disposed in the annular groove.

3. The valve seat of claim 1, wherein the outside surface of the seat body is tapered at a third angle from the valve seat axis; and
wherein the third angle is greater than 0 degrees and less than or equal to 5 degrees measured from the valve seat axis.

4. The valve seat of claim 1, further comprising an annular notch formed in the seat body and adjacent each of the outside surface and the frusto-conical surface.

5. A valve seat adapted to be disposed within a fluid cylinder for a pump assembly, the valve seat having a valve seat axis, the valve seat comprising a seat body and a bore formed through the seat body, wherein the valve seat body comprises a tapered external shoulder, the tapered external shoulder defining a first angle of greater than or equal to 25 degrees and less than or equal to 35 degrees measured from the valve seat axis, wherein the valve seat body defines a first outside diameter of greater than or equal to 5 inches and a second outside diameter of less than 4.6 inches, and wherein the bore defines an inside diameter of greater than or equal to 3 inches and less than or equal to 3.5 inches, the inside diameter being less than the second outside diameter; wherein the seat body comprises an enlarged-diameter portion at one end thereof, the enlarged-diameter portion comprising the tapered external shoulder, the tapered external shoulder further defining a frusto-conical surface extending at the first angle from the valve seat axis, wherein the enlarged-diameter portion of the seat body defines a tapered inside surface, the tapered inside surface extending at a second angle from the valve seat axis, wherein the enlarged-diameter portion further defines a first cylindrical surface extending axially from the frusto-conical surface, the first cylindrical surface defining the first outside diameter, wherein the seat body defines an outside surface, the outside surface defining the second outside diameter, and wherein the frusto-conical surface is axially disposed between the outside surface and the first cylindrical surface.

6. The valve seat of claim 5, wherein the bore defines a second cylindrical surface, the second cylindrical surface defining the inside diameter.

7. The valve seat of claim 5, further comprising: an annular groove formed in the outside surface of the seat body; and a sealing element disposed in the annular groove.

8. The valve seat of claim 5, wherein the outside surface of the seat body is tapered at a third angle from the valve seat axis; and
   wherein the third angle is greater than 0 degrees and less than or equal to 5 degrees measured from the valve seat axis.

9. The valve seat of claim 5, further comprising an annular notch formed in the seat body and adjacent each of the outside surface and the frusto-conical surface.

10. A valve seat adapted to be disposed within a fluid cylinder for a pump assembly, the valve seat having a valve seat axis, the valve seat comprising:
   a seat body, the seat body comprising an enlarged-diameter portion at one end thereof, the enlarged-diameter portion comprising a tapered external shoulder, the tapered external shoulder defining a frusto-conical surface extending at a first angle from the valve seat axis, wherein the first angle is 30 degrees measured from the valve seat axis,
   wherein the enlarged-diameter portion defines a first cylindrical surface extending axially from the frusto-conical surface, the first cylindrical surface defining a first outside diameter,
   wherein the first outside diameter is greater than or equal to 5 inches,
   wherein the seat body defines an outside surface, the outside surface defining a second outside diameter that is less than the first outside diameter,
   wherein the second outside diameter is less than 4.6 inches,
   wherein the frusto-conical surface is axially disposed between the outside surface and the first cylindrical surface,
   wherein the outside surface of the seat body is tapered at a second angle from the valve seat axis, and
   wherein the second angle is greater than 0 degrees and less than or equal to 5 degrees measured from the valve seat axis;
a bore formed through the seat body, the bore defining a second cylindrical surface, the second cylindrical surface defining an inside diameter that is less than the second outside diameter, wherein the inside diameter is greater than or equal to 3 inches and less than or equal to 3.5 inches;
an annular groove formed in the outside surface of the seat body, the annular groove defining a groove diameter that is less than the second outside diameter and greater than the inside diameter;
a sealing element disposed in the annular groove; and
an annular notch formed in the seat body and adjacent each of the outside surface and the frusto-conical surface;
wherein the enlarged-diameter portion of the seat body further defines a tapered inside surface, the tapered inside surface extending at a third angle from the valve seat axis.

\* \* \* \* \*